(12) United States Patent
Kumar

(10) Patent No.: US 11,630,688 B2
(45) Date of Patent: Apr. 18, 2023

(54) METHOD AND APPARATUS FOR MANAGING CONTENT ACROSS APPLICATIONS

(71) Applicant: Samsung Electronics Co., Ltd, Gyeonggi-do (KR)

(72) Inventor: Sumit Kumar, Haryana (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 15/886,701

(22) Filed: Feb. 1, 2018

(65) Prior Publication Data

US 2018/0217864 A1 Aug. 2, 2018

(30) Foreign Application Priority Data

Feb. 2, 2017 (IN) .............................. 201741003932

(51) Int. Cl.
| | |
|---|---|
| *G06F 17/00* | (2019.01) |
| *G06F 9/48* | (2006.01) |
| *G06F 9/451* | (2018.01) |
| *H04L 41/08* | (2022.01) |
| *H04L 67/10* | (2022.01) |

(Continued)

(52) U.S. Cl.
CPC .............. *G06F 9/48* (2013.01); *G06F 3/0485* (2013.01); *G06F 3/0488* (2013.01); *G06F 3/04855* (2013.01); *G06F 9/451* (2018.02); *G06F 16/435* (2019.01); *G06F 16/903* (2019.01); *G06F 16/9535* (2019.01); *G06Q 10/10* (2013.01);

(Continued)

(58) Field of Classification Search
CPC ...... G06F 3/0485; G06F 3/0488; G06F 16/40; G06F 16/435; G06F 9/451; G06F 3/04855; G06F 9/48; H04L 41/08; H04L 67/10
USPC ................................ 715/208, 201, 708, 825
See application file for complete search history.

(56) References Cited

U.S. PATENT DOCUMENTS

| | | |
|---|---|---|
| 8,204,897 B1 | 6/2012 | Djabarov et al. |
| 8,516,059 B1 | 8/2013 | Singh et al. |

(Continued)

FOREIGN PATENT DOCUMENTS

WO 2016/046824 A1 3/2016

OTHER PUBLICATIONS

Notification of Transmittal of the International Search Report and the Written Opinion of the International Searching Authority, or the Declaration dated May 21, 2018 in connection with International Patent Application No. PCT/KR2018/001451.

(Continued)

*Primary Examiner* — Stephen S Hong
*Assistant Examiner* — Matthew J Ludwig

(57) ABSTRACT

The present disclosure provides a method and electronic device for managing content across applications and a terminal using the method and including the electronic device. The method includes receiving, by a content manager processor of the electronic device in a first application, at least one query requesting a data item, determining at least one second application including the requested data item based on the at least one query, and displaying on a graphical user interface of the first application a graphical element that includes indicia indicating the at least one second applica- (Continued)

tion and at least one interactive component to interact with the data item within the graphical user interface of the first application.

12 Claims, 25 Drawing Sheets

(51) Int. Cl.
  G06F 3/04855 (2022.01)
  G06F 16/903 (2019.01)
  G06F 3/0488 (2022.01)
  G06F 16/435 (2019.01)
  G06F 3/0485 (2022.01)
  G06Q 50/00 (2012.01)
  G06F 16/9535 (2019.01)
  G06Q 10/10 (2023.01)
  H04L 67/131 (2022.01)

(52) U.S. Cl.
  CPC ............. *G06Q 50/01* (2013.01); *H04L 41/08* (2013.01); *H04L 67/10* (2013.01); *H04L 67/131* (2022.05)

(56) References Cited

U.S. PATENT DOCUMENTS

| | | | |
|---|---|---|---|
| 8,849,931 B2 | 9/2014 | Linner et al. | |
| 9,058,366 B2 * | 6/2015 | Brezina | G06F 3/0481 |
| 9,275,126 B2 * | 3/2016 | Smith | G06F 16/9535 |
| 9,330,145 B2 | 5/2016 | Satyanarayanan | |
| 9,401,947 B1 * | 7/2016 | Oztaskent | G06F 16/9558 |
| 10,263,933 B2 * | 4/2019 | Judd | H04L 51/18 |
| 10,866,994 B2 * | 12/2020 | Panuganty | G06F 16/951 |
| 10,922,094 B2 * | 2/2021 | Morris | G06F 9/4451 |
| 11,227,017 B2 * | 1/2022 | Schaer | G06F 16/90324 |
| 2007/0198340 A1 | 8/2007 | Lucovsky et al. | |
| 2008/0065507 A1 * | 3/2008 | Morrison | H04N 21/235 705/27.1 |
| 2008/0201434 A1 * | 8/2008 | Holmes | H04L 51/04 709/206 |
| 2011/0010376 A1 * | 1/2011 | Kawauchi | G01C 21/36 707/758 |
| 2011/0077046 A1 * | 3/2011 | Durand | H04L 67/04 455/550.1 |
| 2011/0185281 A1 | 7/2011 | Pearson et al. | |
| 2012/0209804 A1 * | 8/2012 | Lee | G06F 16/9566 707/610 |
| 2013/0069976 A1 * | 3/2013 | Lee | G06F 3/0485 345/619 |
| 2013/0097632 A1 * | 4/2013 | Shah | H04N 21/2408 725/32 |
| 2013/0151336 A1 * | 6/2013 | Goralnick | G06Q 30/0252 705/14.54 |
| 2013/0325971 A1 | 12/2013 | Winer | |
| 2014/0046923 A1 * | 2/2014 | Ruble | G06F 3/04847 707/706 |
| 2014/0059030 A1 * | 2/2014 | Hakkani-Tur | G06F 16/3338 707/706 |
| 2014/0135069 A1 * | 5/2014 | Jung | G06F 3/041 455/566 |
| 2014/0141810 A1 * | 5/2014 | Shin | G01C 21/362 455/566 |
| 2014/0171133 A1 | 6/2014 | Stuttle et al. | |
| 2014/0195621 A1 * | 7/2014 | Rao Dv | H04L 12/1827 709/206 |
| 2014/0256292 A1 * | 9/2014 | Son | H04W 4/14 455/412.1 |
| 2014/0278783 A1 * | 9/2014 | Du | G06Q 30/0203 705/7.32 |
| 2014/0310108 A1 * | 10/2014 | Ryu | G06Q 30/0276 705/14.72 |
| 2015/0019665 A1 * | 1/2015 | Linner | G06F 17/2765 709/206 |
| 2015/0178388 A1 | 6/2015 | Winnemoeller et al. | |
| 2015/0256597 A1 * | 9/2015 | Gessner | G06Q 10/06 709/217 |
| 2016/0012186 A1 * | 1/2016 | Zasowski | G06Q 10/10 705/3 |
| 2016/0036751 A1 * | 2/2016 | Ban | H04L 51/06 455/414.1 |
| 2016/0055246 A1 * | 2/2016 | Marcin | G06F 16/903 707/732 |
| 2016/0171538 A1 * | 6/2016 | Balasubramanian | G06F 16/24565 705/14.53 |
| 2016/0301639 A1 * | 10/2016 | Liu | H04L 51/52 |
| 2017/0206052 A1 * | 7/2017 | Sarkar | G01C 21/3617 |
| 2017/0295122 A1 * | 10/2017 | Pfriem | H04L 51/04 |
| 2019/0258972 A1 * | 8/2019 | De Spong | G06Q 10/06 |

OTHER PUBLICATIONS

Supplementary European Search Report dated Feb. 5, 2020 in connection with European Patent Application No. 18 74 8190, 10 pages.

\* cited by examiner

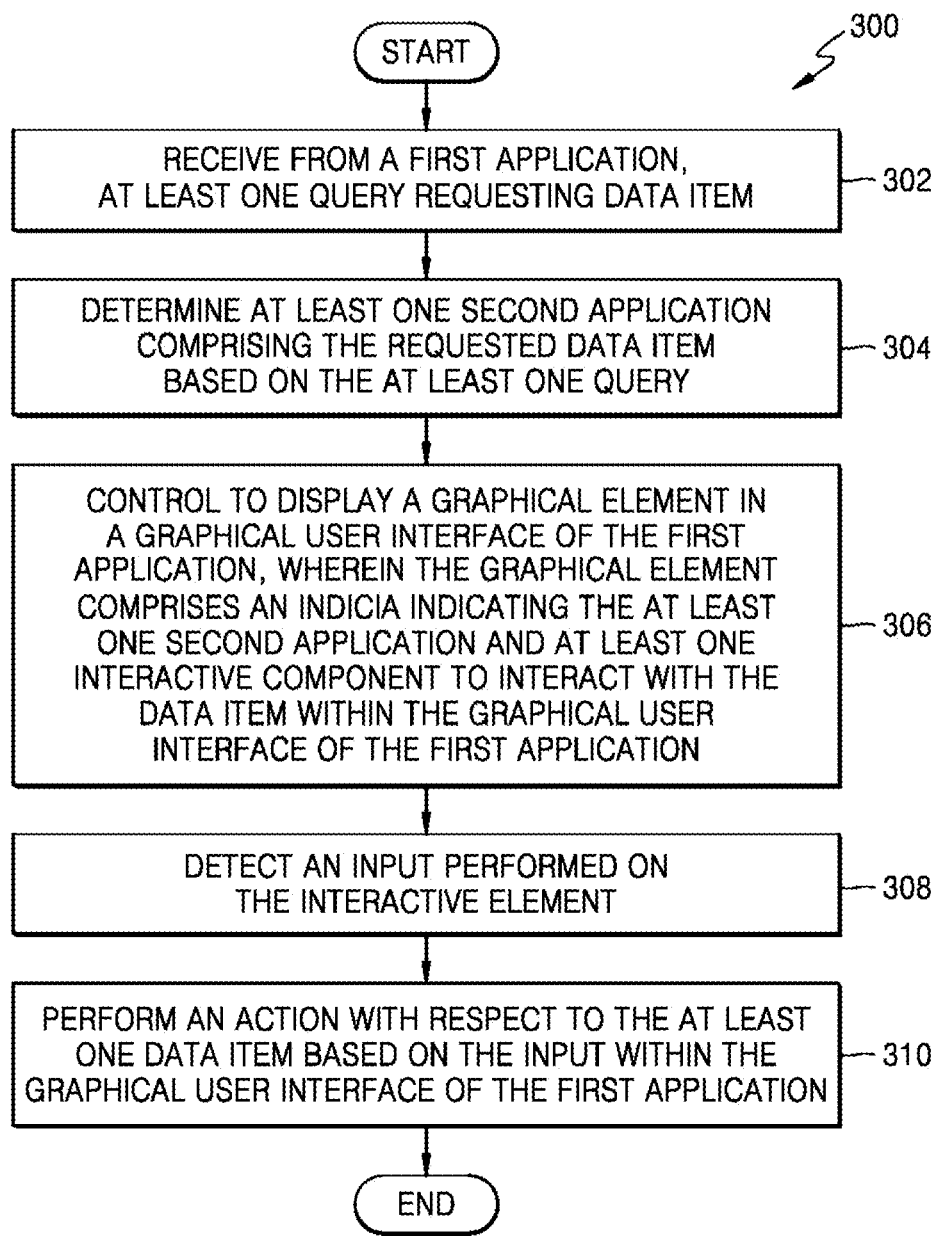

FIG. 7A
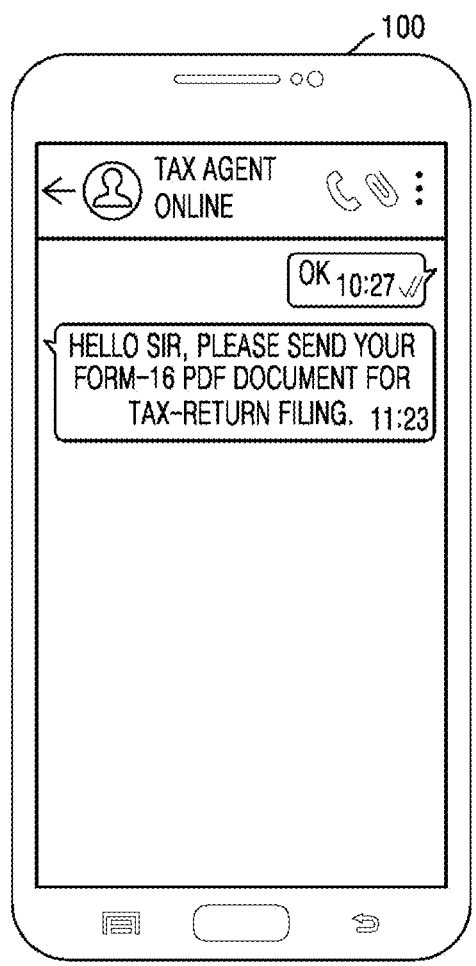
FIG. 7B
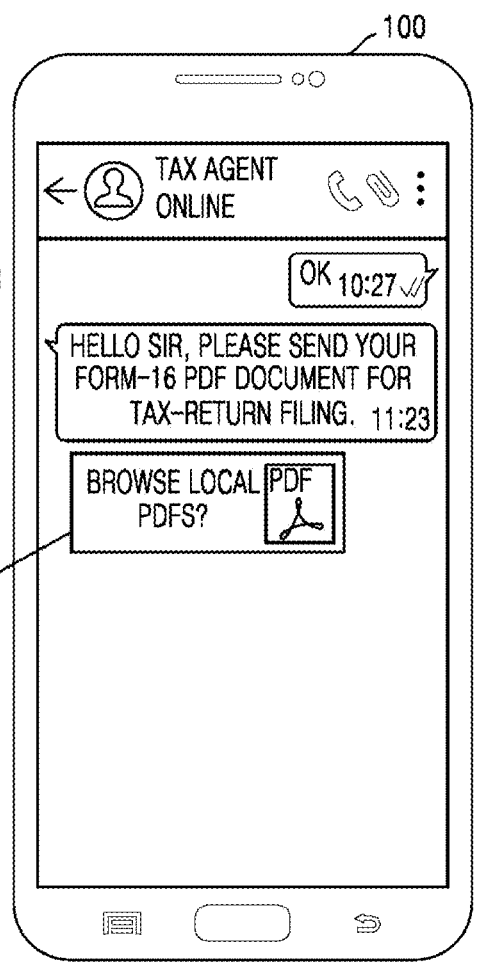

FIG. 11A
FIG. 11B
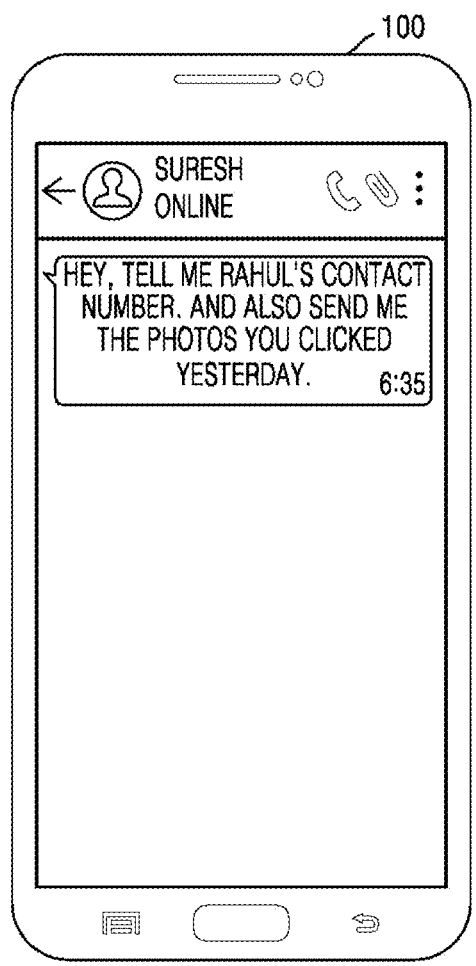
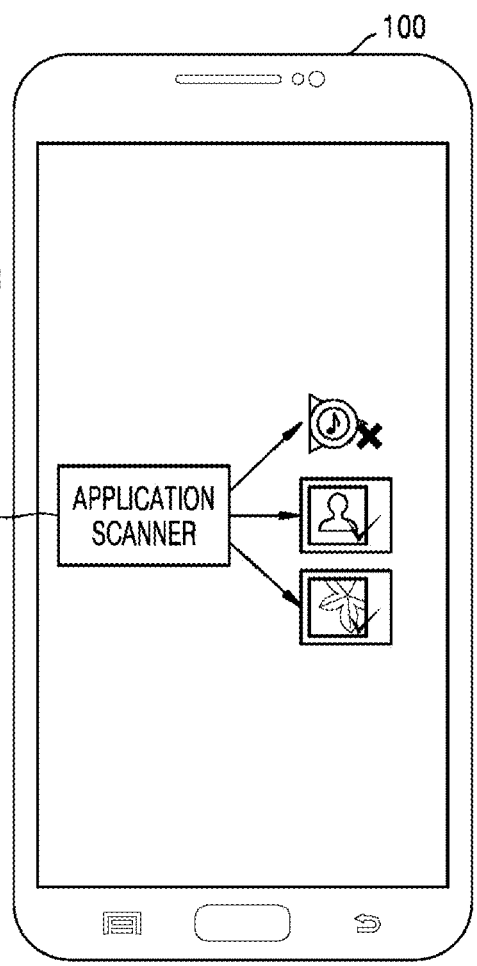

METHOD AND APPARATUS FOR MANAGING CONTENT ACROSS APPLICATIONS

CROSS-REFERENCE TO RELATED APPLICATION AND CLAIM OF PRIORITY

This application is related to and claims the benefit of India Patent Application No. 201741003932 filed on Feb. 2, 2017, the contents of which are incorporated herein by reference.

TECHNICAL FIELD

The present disclosure relates to electronic devices. More particularly, the present disclosure relates to a method and electronic device for managing content across applications available on the electronic device.

BACKGROUND

During user communication in an active application on an electronic device, the electronic device may receive a query. To answer the query, a user has to extract or use content or information from one or more passive applications. In order to extract the content and information, the user needs to access these passive applications available on the electronic device. While the user is accessing these passive applications, the active application enters into background. Further, the user locates and initiates one or more intended applications to copy or share data from the intended applications on the active application. Thus, current approaches for managing content across applications involve cumbersome processes, unnecessary steps, and also lack intuitiveness.

The above information is presented as background information only to assist with an understanding of the present disclosure. No determination has been made, and no assertion is made, as to whether any of the above might be applicable as prior art with regard to the present disclosure.

SUMMARY

The present disclosure provides a method and an electronic device for managing content across applications available on the electronic device, and a terminal using the method and the electronic device, wherein the content may be stored on various devices, cloud systems, computing platforms, online storages, cyberlockers, and the like. The content may be managed based on content metadata, content storing time, content type, and type of device or environment where the content is stored and used, and may be accessed based on status information indicating whether a user is allowed to access the content.

The present disclosure also provides a method of managing content across applications based on application content, content metadata, content storing time, content type, type of device or environment where the content is stored, a type of device or environment where the content is stored and used, and the like.

The present disclosure also provides a method of managing content according to status information of the content, which indicates whether a user is allowed to access the content.

The present disclosure also provides a method of managing content stored on various electronic devices, cloud systems, computing platforms, online storages, and cyberlockers.

The present disclosure also provides a method of receiving, by a content manager processor from a first application, at least one query requesting a data item.

The present disclosure also provides a method of determining at least one second application including the requested data item based on the at least one query.

The present disclosure also provides a method of displaying a graphical element on a graphical user interface of the first application, wherein the graphical element includes an indicia indicating the at least one second application and at least one interactive components to interact with the data item within the graphical user interface of the first application.

The present disclosure also provides a method of detecting an input performed on the interactive element.

The present disclosure also provides a method of performing an action with respect to the at least one data item based on the input within the graphical user interface of the first application.

The present disclosure also provides a terminal using the method and the electronic device of managing content across applications.

The present disclosure provides a method of managing content across applications available on an electronic device. The method includes receiving, by a content manager processor of the electronic device from a first application, at least one query requesting a data item. Further, the method includes determining at least one second application including the requested data item based on the at least one query. Further, the method includes displaying on a graphical user interface of the first application a graphical element that includes indicia indicating the at least one second application and at least one interactive components to interact with the data item within the graphical user interface of the first application.

In an embodiment, the method further includes detecting an input performed on the interactive element. Further, the method includes performing an action with respect to the at least one data item based on the input within the graphical user interface of the first application.

In an embodiment, the graphical element includes a scrollable component to scroll one or more of the at least one second application and at least one data item associated with the at least one second application within the graphical user interface of the first application.

In an embodiment, the indicia indicating the at least one second application are dynamically arranged based on a degree of relevance with respect to the requesting data item.

In an embodiment, the indicia includes a symbol indicating a number of data items available in the at least one second application.

In an embodiment, the first application is an active application and the second application is one of an active application and a passive application.

In an embodiment, the requested data item in the at least one query is identified based at least one of content the first application, metadata of the content of the first application, storing time of the content of the first application, type of the content of the first application, type of device or environment where the content of the first application is stored and used, status information indicating whether a user is allowed to access the content of the first application, and context analysis of the first application.

In an embodiment, the at least one query is automatically generated based on the content of the first application, the metadata of the content of the first application, the storing time of the content of the first application, the type of the content of the first application, the type of device or environment where the content of the first application is stored and used, the status information indicating whether a user is allowed to access the content of the first application, and the context analysis of the first application.

In an embodiment, the at least one second application including the requested data item is determined based on one or more of the content the first application, the metadata of the content of the first application, the storing time of the content of the first application, the type of the content of the first application, type of device or environment where the content of the first application is stored and used, the status information indicating whether a user is allowed to access the content of the first application, the context analysis of the first application, and user hi story activities.

In an embodiment, the first application is same as or different from the second application.

The embodiments herein also provide an electronic device for managing content across applications. The electronic device includes a content manager processor configured to receive, from a first application, at least one query requesting data item. Further, the content manager processor is configured to determine at least one second application including the requested data item based on the at least one query. Further, the content manager processor is configured to cause to display a graphical element in a graphical user interface of the first application, wherein the graphical element includes indicia indicating the at least one second application and at least one interactive component to interact with the data item within the graphical user interface of the first application.

The embodiments therein also provide a computing environment using the method and electronic device of managing content across applications.

The embodiments herein also provide a computer program product including a computer executable program code recorded on a computer readable non-transitory storage medium. The computer executable program code, when executed, causes the actions including receiving by a content manager processor, from a first application, at least query requesting data item. Further, the computer executable program code, when executed, causes the actions including determining by the content manager processor at least one second application comprising the requested data item based on the at least one query. Further, the computer executable program code, when executed, causing the actions including displaying by the content manager processor on a graphical user interface of the first application a graphical element, that includes indicia indicating the at least one second application and at least one interactive component to interact with the data item within the graphical user interface of the first application.

These and other embodiments herein will be better appreciated and understood when considered in conjunction with the following description and the accompanying drawings. It should be understood, however, that the following descriptions, while indicating the embodiments and numerous specific details thereof, are given by way of illustration and not of limitation. Many changes and modifications may be made within the scope of the embodiments herein without departing from the spirit thereof and the embodiments herein include all such modifications.

Other aspects, advantages, and salient features of the disclosure will become apparent to those skilled in the art from the following detailed description, which, when taken in conjunction with the annexed drawings, discloses present disclosure of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates a flow diagram of a method of managing content across applications available on an electronic device, according to an embodiment of the present disclosure;

FIGS. 7A-7D illustrate a scenario in which a user "Tax Agent" receives a request to share a PDF file, according to an embodiment of the present disclosure;

FIGS. 11A-11C illustrate a scenario in which a user is provided with more than one second application for more than one query, according to an embodiment of the present disclosure.

Throughout the drawings, it should be noted that like reference numbers are used to depict the same or similar elements, features, and structures.

DETAILED DESCRIPTION

Figure 1:
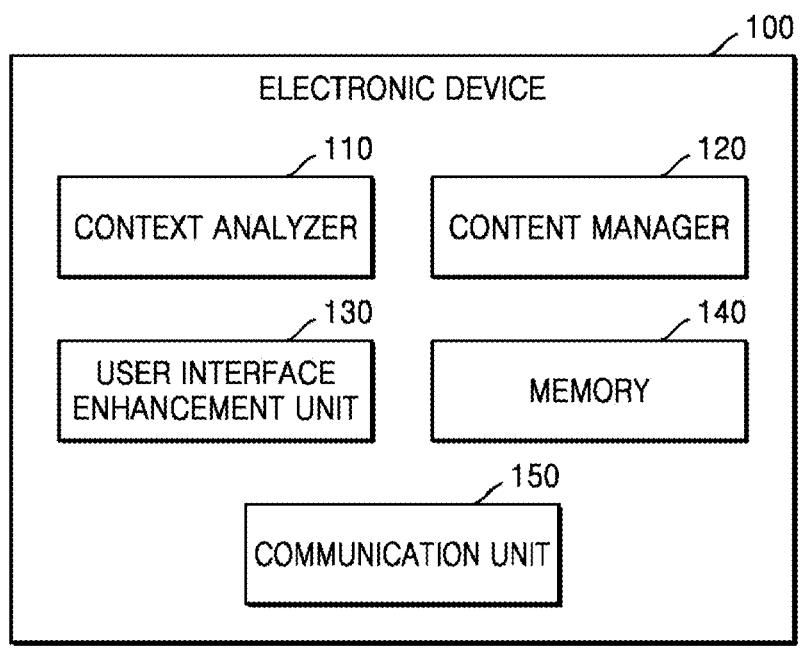
FIG. 1 illustrates a diagram of an electronic device for managing content across applications available on the electronic device, according to an embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure will now be described in detail with reference to the accompanying drawings. In the following description, specific details such as detailed configurations and components are merely provided to help the overall understanding of the various embodiments of the present disclosure. Therefore, it should be apparent to those skilled in the art that various changes and modifications may be made to the various embodiments described herein without departing from the scope and spirit of the present disclosure. In addition, descriptions of well-known functions and constructions are omitted for clarity and conciseness.

Also, the various embodiments described herein are not necessarily mutually exclusive, and some embodiments may be combined with one or more other embodiments to form new embodiments.

The term "or" as used herein, refers to a non-exclusive or, unless otherwise indicated. The embodiments used herein are intended merely to facilitate an understanding as to how the present disclosure may be practiced and to further enable those skilled in the art to practice the present disclosure. Accordingly, the embodiments should not be construed as limiting the scope of the present disclosure.

It is to be understood that the singular forms "a," "an," and "the" include plural referents unless the context clearly dictates otherwise. Thus, for example, reference to "a component surface" includes reference to one or more of component surfaces.

The present disclosure may be described and illustrated in terms of blocks to carry out a described function or functions. These blocks, which may be referred to herein as units, modules, devices, elements, or the like, are physically implemented via analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips or on substrate supports such as printed circuit boards and the like. The circuits constituting a block may be implemented via dedicated hardware, via a processor (e.g., one or more programmed microprocessors and associated circuitry), or via a combination of dedicated hardware to perform some functions of the block and a processor to perform other functions of the block. Each block of the present disclosure may be physically separated into two or more interacting and discrete blocks without departing from the scope of the present disclosure. Likewise, the blocks in the present disclosure may be physically combined into more complex blocks without departing from the scope of the present disclosure.

Accordingly, the present disclosure provides a method of managing content across applications available on an electronic device. The method includes receiving, from a first application, at least one query requesting a data item. Further, the method includes determining at least one second application comprising the requested data item based on the at least one query. Further, the method includes displaying a graphical element on a graphical user interface of the first application, wherein the graphical element includes an indicia indicating the at least one second application and at least one interactive components to interact with the data item within the graphical user interface of the first application.

The related methods and systems for managing content across applications do not include any feature of scanning available applications on the electronic device and providing the most useful option to a user based on a current context. Unlike related methods and systems, the proposed method is an intuitive approach that allows a user to easily respond to at least one query when using an application.

Unlike related methods and systems, the method of the present disclosure may be used to facilitate communication mechanisms such as chat systems with various context based suggestions that are linked with applications which are available on the electronic device. These context based suggestions provide an intuitive way for the user to send responses to the received at least one query. Further, the method of the present disclosure allows the electronic device to perform a context level analysis to map the results to available applications on the electronic device and querying an application which is the most relevant with respect to the at least one query.

Further, based on the context level analysis, the at least one second application (i.e., a target or passive application) on the electronic device is scanned and accessed to pass the contextual query. The passive application may or may not provide relevant content to the user (i.e., an end-user) on the active application. Further, a user response is recorded so that the user response may be processed by the passive application in the background.

In related systems and methods, an electronic device generates a response by processing data from target applications. Unlike related method and systems, in the present disclosure, the electronic device may scan and determine at least one second application that may serve the current context and does not generate or adapt any content by itself. Further, the method may be used to provide a sandbox like environment for at least one second application in a first application (i.e., an active application) interactive session.

Prior to describing the present disclosure in detail, the following keywords are defined as follows.

Active application (First application): An active application is an application on which a user receives an incoming message (i.e., at least one query). The active application runs in the foreground of the electronic device, and the user interacts with the active application on a graphical user interface based environment. One active application is available at a time.

Passive application (Second application): A passive application is an application that is available on an electronic device, but the application is not in use currently. One or more passive applications may be simultaneously available on the electronic device. The passive applications are in the background of the electronic device, while the user is communicating with another user via the active application.

Referring now to the drawings, and more particularly to FIGS. 1 through 12, reference numerals and characters consistently denote corresponding features throughout the figures.

FIG. 1 illustrates a diagram of an electronic device 100 for managing content across applications available on the electronic device 100, according to an embodiment of the present disclosure. In an embodiment, the electronic device 100 may be, for example, a laptop, a desktop computer, a mobile phone, a smart phone, Personal Digital Assistants (PDAs), a tablet, a phablet, a consumer electronic device, a dual display device, a head mounted display, a Virtual Reality (VR) device, a wearable device, an Internet of Things (IoT) device, an Augmented Reality (AR) device, or any other electronic device. The electronic device 100 may include a context analyzer 110, a content manager 120, a User Interface (UI) enhancement unit 130, a memory 140, and a communication unit 150. The context analyzer 110, the content manager 120, the user interface enhancement unit 130 and the communication unit 150 can be implemented as a hardware device such as one or more processors.

The context analyzer 110 may communicate with an active application (i.e., a first application), may be capable of parsing text to sense context of the communication, and may generate at least one query requesting a data item based on the sensed context. The active application may be, for example, a messaging application, social networking site (SNS) application, e-mail application, gallery application, call application, music application, chat application, or any other application available on the electronic device 100. The context analyzer 110 may be configured to receive a communication such as a short message service (SMS), chat, email, or the like. Further, the context analyzer 110 may be configured to perform a context level analysis via natural language processing (NLP) to detect the context of the communication. Further, the context analyzer 110 may be configured to perform an initial context analysis to detect the feasibility and need for further processing (i.e., contacting the content manager 120).

Further, the content manager 120 may be configured to receive, from the first application, the at least one query requesting the data item. In an embodiment, the first application is the active application. In an embodiment, the at least one query is automatically generated based on content and context analysis of the first application. According to an embodiment, the at least one query may be automatically generated based on the content of the first application, metadata of the content of the first application, storing time of the content of the first application, type of a device or environment where the content of the first application is used or stored, and status information indicating whether a user may be able to access the content of first application. According to an embodiment, the content of the first application may be stored on one or more of the electronic device, another electronic device, a cloud system, a computing platform, an online storage, and a cyberlocker. Further, the content manager 120 may be configured to determine at least one second application (or second application(s)) including the requested data item based on the at least one query. Further, the content manager 120 may be configured to control a display to display a graphical element on a graphical user interface of the first application, wherein the graphical element includes an indicia indicating the at least one second application and at least one interactive component to interact with the data item within the graphical user interface of the first application. In an embodiment, the second application is one of an active application and a passive application. In an embodiment, the requested data item may be a contact of a user, skills/technologies related to a user, a PDF document, or the like.

In an embodiment, the graphical element includes a scrollable component to scroll one of the at least one second application and at least one data item associated with the at least one second application within the graphical user interface of the first application. In an embodiment, indicia indicating the at least one second application are dynamically arranged based on a degree of relevance with respect to the requested data item. In an embodiment, the indicia include a symbol indicating a number of data items available in the at least one second application. In an embodiment, the requested data item in the at least one query is identified based on one or more of the content of the first application, the metadata of the content of the first application, the storing time of the content of the first application, the type of the device or environment where the content of the first application is used or stored, and the status information indicating whether the user may be able to access the content of first application, and the context analysis of the first application.

In an embodiment, the at least one second application including the requested data item is determined based on one or more of the content of the first application, the metadata of the content of the first application, the storing time of the content of the first application, the type of the device or environment where the content of the first application is used or stored, the status information indicating whether the user may be able to access the content of first application, the context analysis of the first application, and user history activities. In an embodiment, the first application is same as or different from the second application. The content manager 120 is further configured to detect an input performed on the interactive element. In an embodiment, the input may be a touch gesture, a swipe gesture, a hover gesture, or the like. Further, the content manager 120 is configured to perform an action with respect to the at least one data item based on the input within the graphical user interface of the first application. In an embodiment, the action may be sending/sharing the requested data item such as sharing a user's contact, sharing a date, sharing a PDF document. The additional functionalities of the content manager 120 are explained in conjunction with FIG. 2 according to an embodiment of the present disclosure.

The UI enhancement unit 130 is configured to reserve a display screen space on the graphical user interface of the corresponding first application (i.e., the active application). Further, the UI enhancement unit 130 is configured to populate the data representation instructions received from the at least one second application (i.e., the at least one passive application). Further, the UI enhancement unit 130 is configured to send a user response to the content manager 120 so that the response can be passed back to the at least one second application.

The memory 140 may include one or more computer-readable storage media. The memory 140 may include non-volatile storage elements. Examples of the non-volatile storage elements may include, but are not limited to, magnetic hard discs, optical discs, floppy discs, flash memories, or forms of electrically programmable memories (EPROM) or electrically erasable and programmable (EEPROM) memories. The memory 140 may, in some embodiments, be a non-transitory storage medium. The term "non-transitory" may indicate that the storage medium is not embodied in a carrier wave or a propagated signal. However, the term "non-transitory" should not be interpreted in the sense that the memory 140 is non-movable. In some embodiments, the memory unit 140 may be configured to store larger amounts of information than the memory. In certain embodiments, a non-transitory storage medium may store data that may, over time, change (e.g., in Random Access Memory (RAM) or cache). The communication unit 150 may communicate internally with other elements and externally with networks.

In related methods and systems, a context based webpage is adapted to a link which may be accessed by all users in an instant messaging (IM) session. However, according to an embodiment, no automatic response is added in the IM session in the method of the present disclosure. According to an embodiment of the present disclosure, suggestion(s) may be provided to the user, who may decide to accept or ignore the suggestions, and no IM session content is modified automatically.

FIG. 1 illustrates an overview of the electronic device 100, however, the electronic device 100 is not limited to the components shown in FIG. 1 and may include other components. Further, the electronic device 100 may include different components for communicating among each other along with other hardware or software components. Both an application running on the electronic device 100 and the electronic device 100 may respectively be a hardware or software component.

Figure 2:
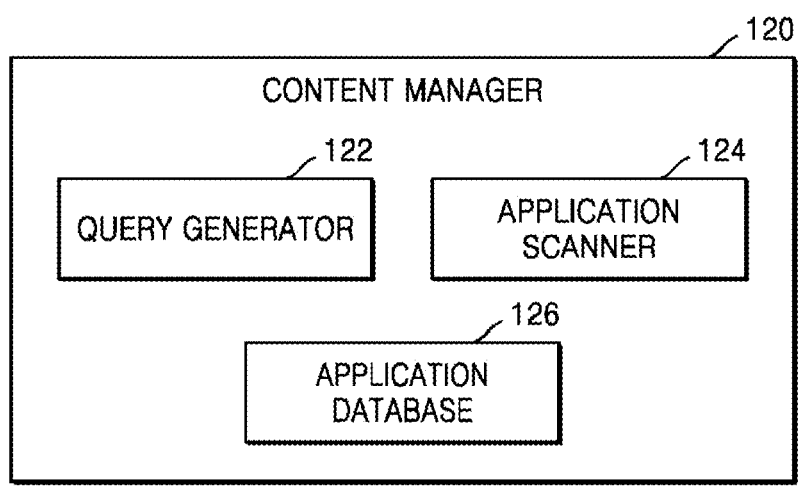
FIG. 2 illustrates various elements of a content manager processor, according to an embodiment of the present disclosure.

FIG. 2 illustrates various units of the content manager 120, according to an embodiment. In an embodiment, the content manager 120 may include a query generator 122, an application scanner 124, and an application database 126. The content manager 120 may be configured to parse received communication in terms of a set of keywords and a set of commands (or tasks). Further, the content manager 120 may be configured to perform scanning of the applications available on the electronic device 100. The applications available on the electronic device 100 may be scanned to detect which of the applications should be queried for the particular keywords or commands. Further, the content manager 120 may be configured to access (or query) the at least one second application (i.e., the passive applications) via various application programming interfaces (APIs) and fetch a data response.

Further, the query generator 122 may be configured to manage the parsing of the received communication to the keywords and commands. Further, the query generator 122 may be configured to parse the content to create the set of keywords and commands. In an embodiment, the keywords and commands may be used to identify the relevant second applications, i.e., relevant passive applications. The application scanner 124 may be configured to receive the keywords and commands from the query generator 122. The application scanner 124 may be configured to scan the applications available on the electronic device 100, after receiving the keywords and commands, and to determine the relevant second application capable of responding to the at least one query.

Further, the application scanner 124 may determine the second application (i.e., the most relevant application). The application database 126 may be a database including lists with all the applications available on the electronic device 100. Further, the application database 126 may optionally store information about types of the applications and tasks/operations performed by each of the applications in the lists.

In related methods and systems, a user performs the following steps to manage content across applications:
a. User sends the first application to the background;
b. User locates and initiates the intended second application; and
c. User copies or shares the data from the second application to the first application.

Thus, the related approach involves cumbersome and unnecessary steps and also lacks intuitiveness.

Unlike related methods and systems, according to the method of the present disclosure, the user may circumvent switching between the first application and the second applications. A suggestion is provided within the graphical user interface of the first application based on the received query according to the operations below.
a. Context analysis is performed on the first application and the user is provided with the suggestion regarding the second application. The best possible second application is determined by scanning all the applications available on the electronic device 100 and determining the best possible second application that may manage the at least one query.
b. The user selects the second application (if multiple suggestions are provided). Further, without leaving the first application, the user of the electronic device 100 is provided with the interactive component including the content populated by the second application.
c. The user selects the content to send to the first application and the second application sends the data in the background. The graphical user interface of the first application is therefore cleared. Thus, the data/content transmission is performed from the second application to the first application without the user having to leave the first application.

FIG. 2 illustrates an overview of the content manager 120, according an embodiment of the present disclosure. However, the content manager 120 of FIG. 2 may include other components. As shown in FIG. 2, the content manager 120 may include different elements communicating among each other along with other hardware or software components. An application running on the content manager 120 and the content manager 120 may respectively be a hardware or software component.

FIG. 3 illustrates a flow diagram 300 illustrating a method of managing content across applications available on the electronic device 100, according to an embodiment of the present disclosure. In operation 302, the method includes receiving, from the first application, the at least one query requesting the data item. The content manager 120 may receive from the first application the at least one query requesting the data item.

In operation 304, the method includes determining the at least one second application including the requested data item based on the at least one query. The content manager 120 may determine the at least one second application including the requested data item based on the at least one query. In operation 306, the method includes controlling to display the graphical element on the graphical user interface of the first application. The content manager 120 may control a display to display the graphical element on the graphical user interface of the first application. The graphical element includes the indicia indicating the at least one second application and the at least one interactive component to interact with the data item within the graphical user interface of the first application In operation 308, the method includes detecting the input performed on the interactive element. The content manager 120 may detect the input performed on the interactive element. In operation 310, the method includes performing the action with respect to the at least one data item based on the input within the graphical user interface of the first application. The content manager 120 may perform the action with respect to the at least one data item based on the input within the graphical user interface of the first application.

In an embodiment, the method of the present disclosure is used in a context-aware chat application system to provide the user with an estimated option to send quick-replies to the received at least one query. The chat-system recognizes the context from sent text and media (images, etc.) and provides an intuitive and easy way for the user to select options. Further, the user is provided with the context specific options to send quick replies, and thus, an intuitive and easy approach for managing the chat communication is provided to the user. In the related method, a keyword search is performed on Internet search services and the results are displayed to the user. In contrast to the related method, the method of the present disclosure may provide auto reply suggestions to the user.

In an embodiment, the method of the present disclosure includes an operation of performing a context level analysis to map the results of the applications available on the electronic device 100 and contact the one or more second applications which are related to the at least one query. In related methods and systems, certain words or phrases in messages are hyperlinked so that all users in an instant messenger (IM) session may directly access the searched content or advertisements from the keyword hyperlinks. However, according to an embodiment, the method of the present disclosure may be used to provide a suggestion to a recipient, who may choose to ignore/accept the suggestion, and no IM session content is modified automatically. Further, the method of the present disclosure may be be used to scan and detect the second application that may serve the current context and no content is generated or adapted automatically.

In an embodiment, the method of the present disclosure may be used to allow the context aware chat application system to smartly provide the user with an estimated option to facilitate context aware replies in an efficient manner. The chat system recognizes the context from a sent text/SMS and provides an intuitive and easy way for the user to select the options by calling native or third party applications' APIs. The user is provided with the context specific options to send quick replies, and thus, an intuitive and easy is provided to the user to manage the chat communication.

The various actions, acts, operations, or the like in the flow chart 300 may be performed in the order presented, in a different order, or simultaneously. Further, in some embodiments, some of the actions, acts, operations, or the like may be omitted, added, modified, skipped, or the like without departing from the scope of the present disclosure.

Figure 4A:
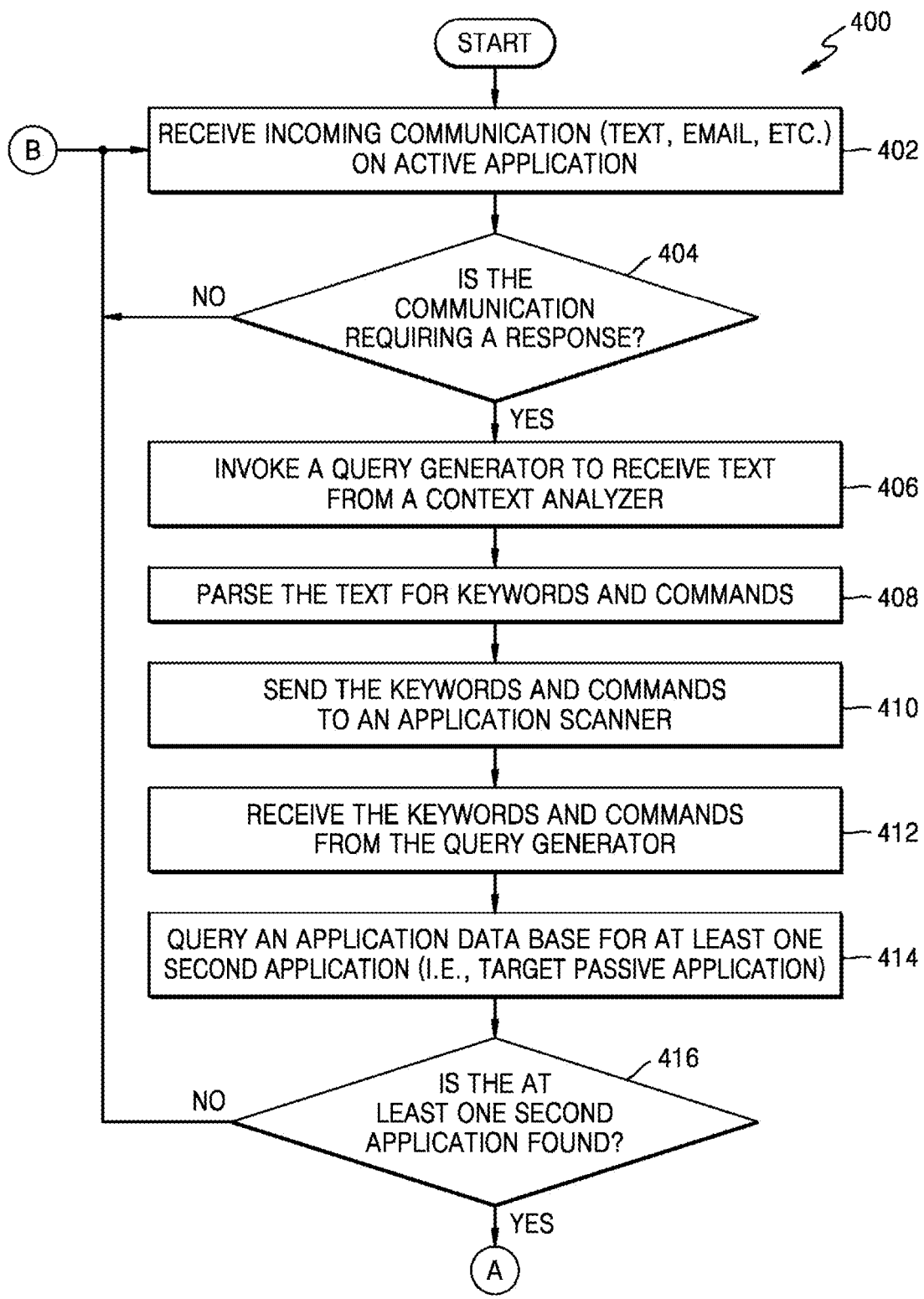
FIGS. 4A-4C illustrate a flow chart of operations performed by various elements in the electronic device, according to an embodiment of the present disclosure.
Figure 4B:
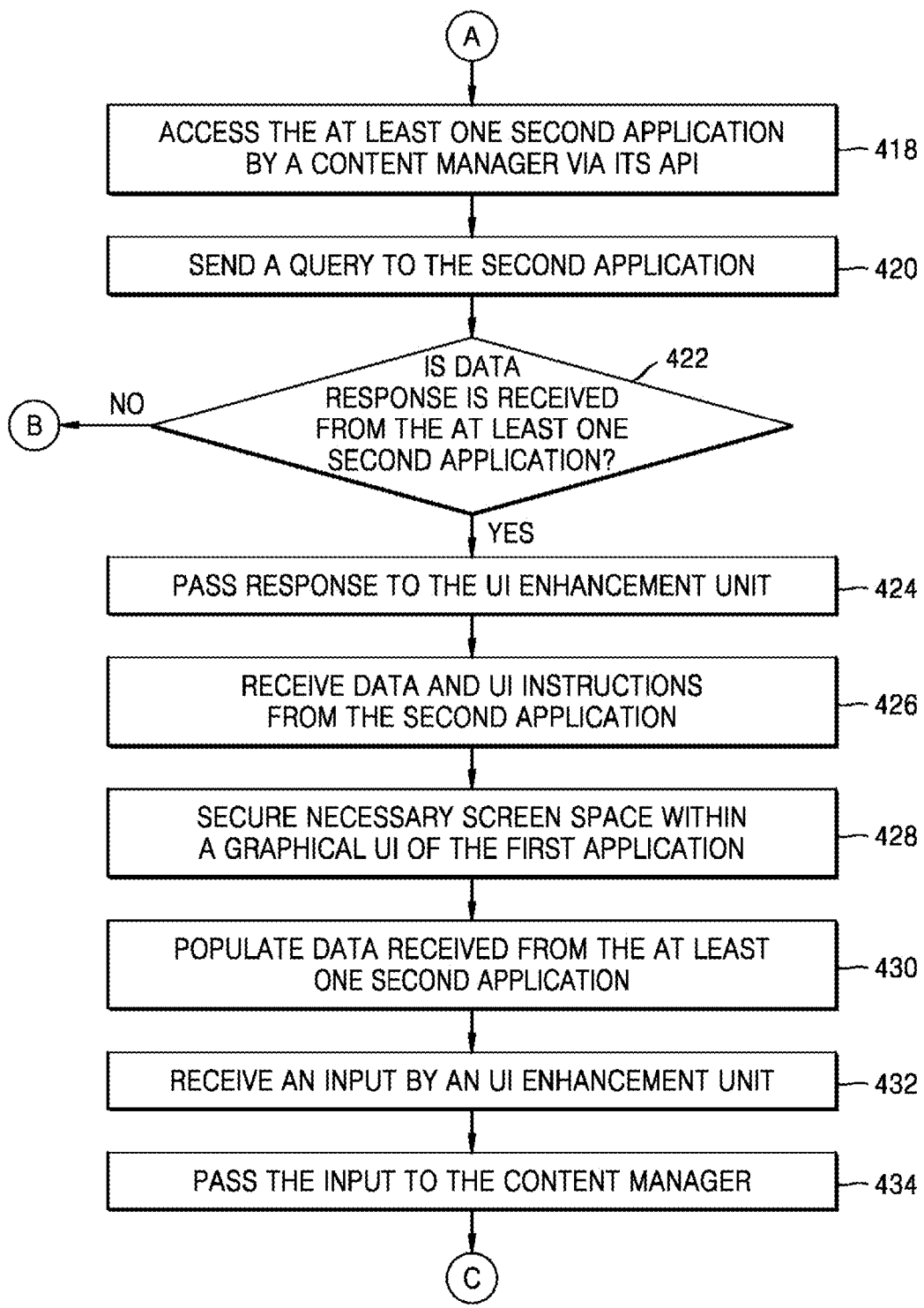
Figure 4C:
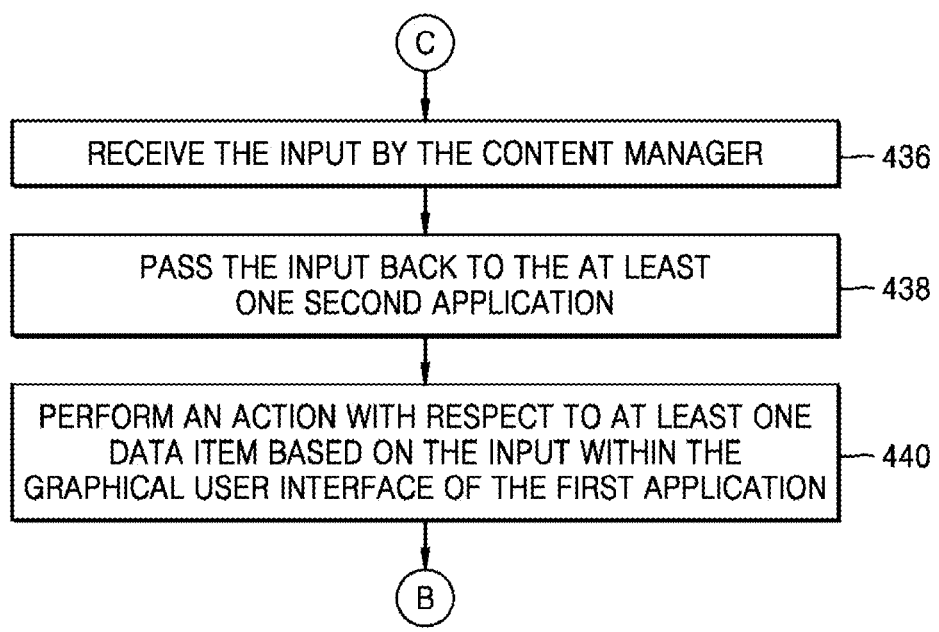

FIGS. 4A-4C illustrate a flow chart 400 of operations performed by various devices in the electronic device 100, according to an embodiment of the present disclosure. In operation 402, the method includes receiving an incoming communication (text, email, etc.) on the first application (i.e., the active application). The content manager 120 may receive the incoming communication.

If it is determined in operation 404 that the incoming communication does not require a response, then, operation 410 is performed. If it is determined in operation 404 that the incoming communication requires a response, then, in operation 406, the method includes invoking the query generator 122 to receive the incoming communication from the context analyzer 110. In operation 408, the method includes parsing the incoming communication for the keywords and commands.

In operation 410, the method includes sending the keywords and commands to the application scanner 124. The query generator 122 may send the keywords and commands to the application scanner 124. In operation 412, the method may include receiving the keywords and commands from the query generator 122. The application scanner 124 may receive the keywords and commands from the query generator 122.

In operation 414, the method may include querying the application database 126 for the at least one second application (i.e., the target passive application). If it is determined in operation 416 that the at least one second application is not found, then, operation 402 is performed. If it is determined in operation 416 that the second application is found, then, in operation 418, the method includes accessing the second application via its API. The content manager 120 may access the second application via its API. In operation 420, the method may include sending the at least one query (or data query) to the second application.

If it is determined in operation 422 that the data response is not received from the second application, then, operation 402 is performed. If it is determined in operation 422 that the at least one query response (or data response) is received from the second application, then, in operation 424, the method may include passing the at least one query response to the UI enhancement unit 130. In operation 426, the method includes receiving data and graphical UI instructions from the second application. In operation 428, the method includes securing screen space within the graphical user interface of the first application.

In operation 430, the method includes populating the data (or data item) received from the second application. In operation 432, the method includes receiving the input (i.e., a user response) by the UI enhancement unit 130. In operation 434, the method includes passing the input to the content manager processor 120. In operation 436, the method includes receiving the input by the content manager 120. In operation 438, the method includes passing the input back to the at least one second application. In operation 440, the method includes performing the action with respect to the at least one data item based on the input within the graphical UI of the first application.

The various actions, acts, operations, or the like in the flow chart 400 may be performed in the order presented, in a different order or simultaneously. Further, in some embodiments, some of the actions, acts, operations, or the like may be omitted, added, modified, skipped, or the like without departing from the scope of the present disclosure.

Figure 5A:
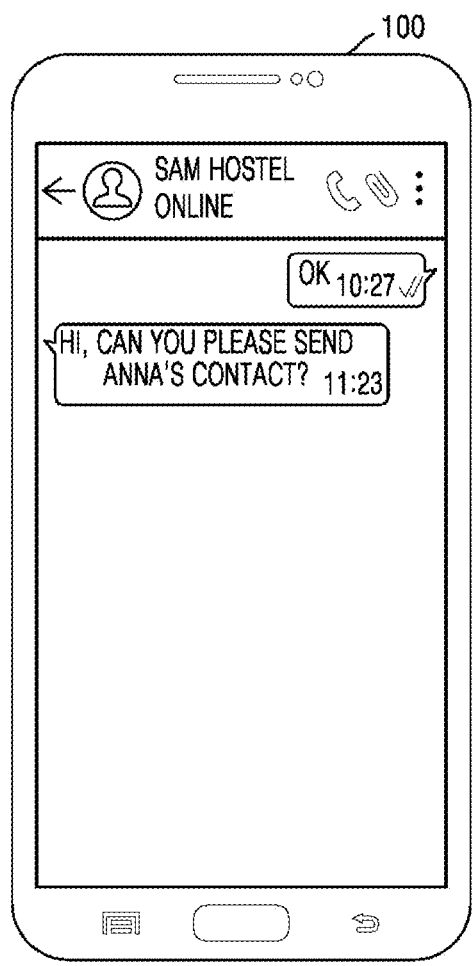
FIGS. 5A-5D illustrate a scenario in which a user "Sam Hostel" receives a request from a user "Ravi" to share a particular chat (i.e., a second application) contact of "Anna", according to an embodiment of the present disclosure.

FIGS. 5A-5D illustrate a scenario in which a user "Sam Hostel" receives a request from a user "Ravi" to share a particular chat (i.e., the second application) contact of "Anna", according to an embodiment of the present disclosure. In this scenario, the user "Sam Hostel" receives the request (or the query) "Hi, can you please send Anna's messaging contact" (i.e., a requested data item) from the user "Ravi" as shown in FIG. 5A. The context analyzer 110 recognizes the need for sending a response. The query generator 122 receives the query requesting the data item (i.e., contact details). After receiving the query, the query generator 122 generates a list of keywords (for example, contact, chat application, etc.) and commands (i.e., finding a contact, selecting a contact, sharing a contact, etc.) and sends the generated keywords and commands to the application scanner 124.

Figure 5B:
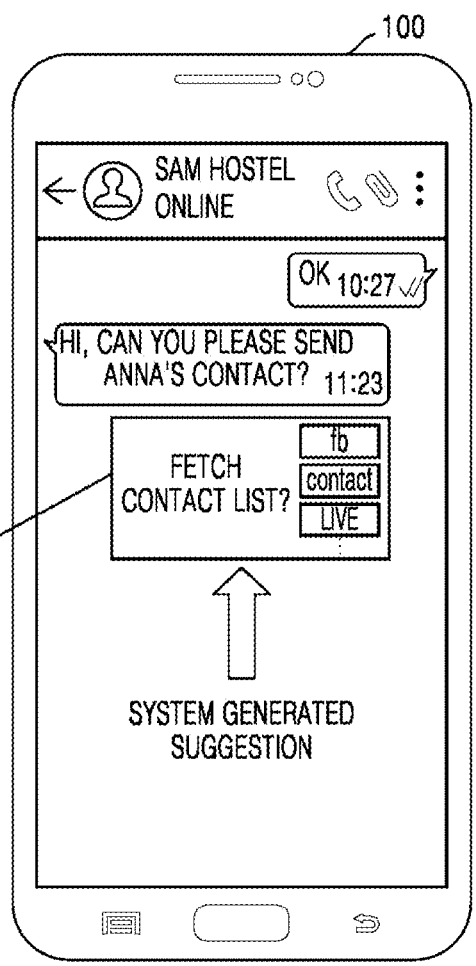

After receiving the keywords and commands, the application scanner 124 filters the applications available on the electronic device 100 to determine the second application among a plurality of the second applications (i.e., the chat application, facebook, phone book etc.) including the requested data item based on the query as shown in FIG. 5B. The plurality of second applications may be depicted with application icons for a user selection as shown in FIG. 5B. After determining the chat application (i.e., the passive application), the chat application is accessed by a user selection and the commands are provided to the chat application via its API. The response from the chat application is received by the UI enhancement unit 130 and the graphical element is displayed in the graphical user interface of the chat application (i.e., the first application). The messaging application is populated within the graphical user interface of the chat application with an option to select a messaging contact as shown in FIG. 5C.

Figure 5C:
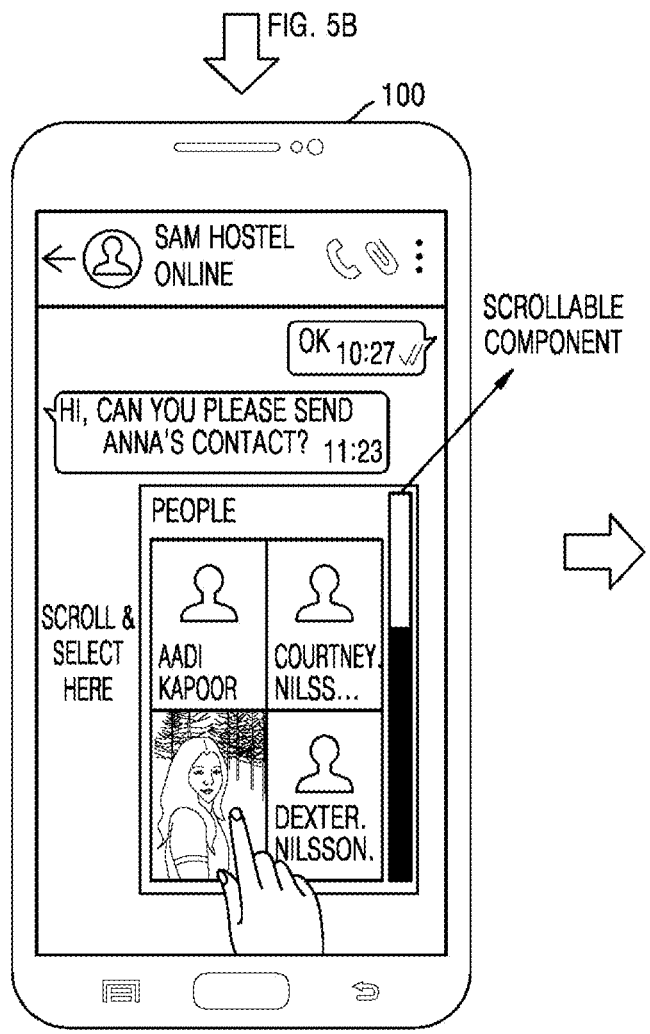
Figure 5D:
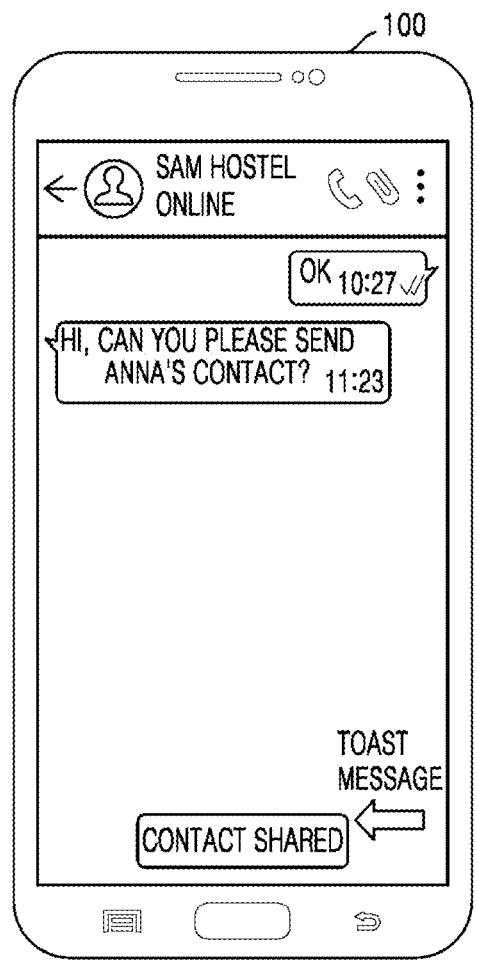

Further, as shown in FIG. 5C, the content manager 120 detects the input performed on Anna's contact (the interactive component) by the user of the electronic device 100 to select Anna's contact. The user selection or response is sent back to the chat application which shares the Anna's contact details to "Ravi" as shown in FIG. 5D.

Figure 6A:
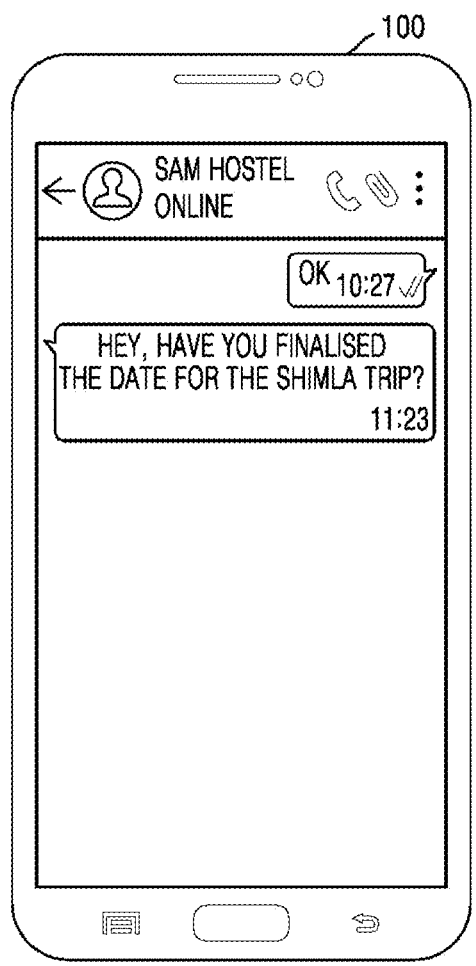
FIGS. 6A-6D illustrate a scenario in which a user "Sam Hostel" receives a request from a user "Ravi" to share a date for a Shimla trip in a text-chat based active application, according to an embodiment of the present disclosure.

FIGS. 6A-6D illustrate a scenario in which a user "Sam Hostel" receives in a text-chat based active application a request from a user "Ravi" to share a date for a trip to Shimla, according to an embodiment of the present disclosure. In this scenario, the user "Sam Hostel" receives the request (or the query) "Hi, have you finalized the date for the Shimla trip" (i.e., the requested data item) from the user "Ravi" as shown in FIG. 6A. The context analyzer 110 recognizes that a response is requested. The query generator 122 receives the query requesting the data item (i.e., date for the Shimla trip). After receiving the query, the query generator 122 generates a list of keywords (for example, data, calendar, event, Shimla trip, etc.) and commands (i.e., selecting a date, finding a date, etc.) and sends the generated keywords and commands to the application scanner 124.

Figure 6B:
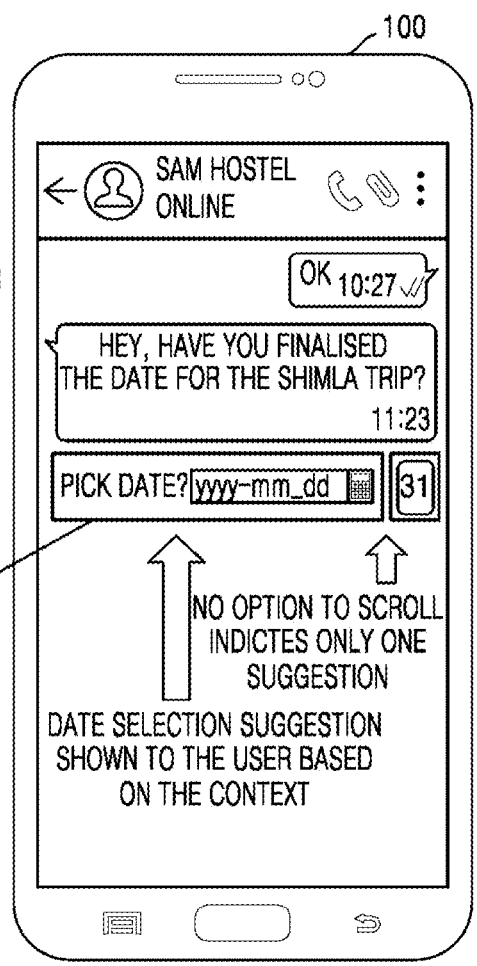

After receiving the keywords and commands, the application scanner 124 filters the applications available on the electronic device 100 to determine the second application (i.e., an S-planner application installed as an activity planner) including the requested data item based on the query as shown in FIG. 6B. After determining the S-planner application (i.e., the passive application), the S-planner application is accessed and the commands are provided to the S-planner application via its API. The response from the S-planner application is received by the UI enhancement unit 130 and the graphical element is displayed in the graphical user interface of the chat application (i.e., the first application). The S-planner application is populated within the graphical user interface of the chat application with an option to select a date as shown in FIG. 6C.

Figure 6C:
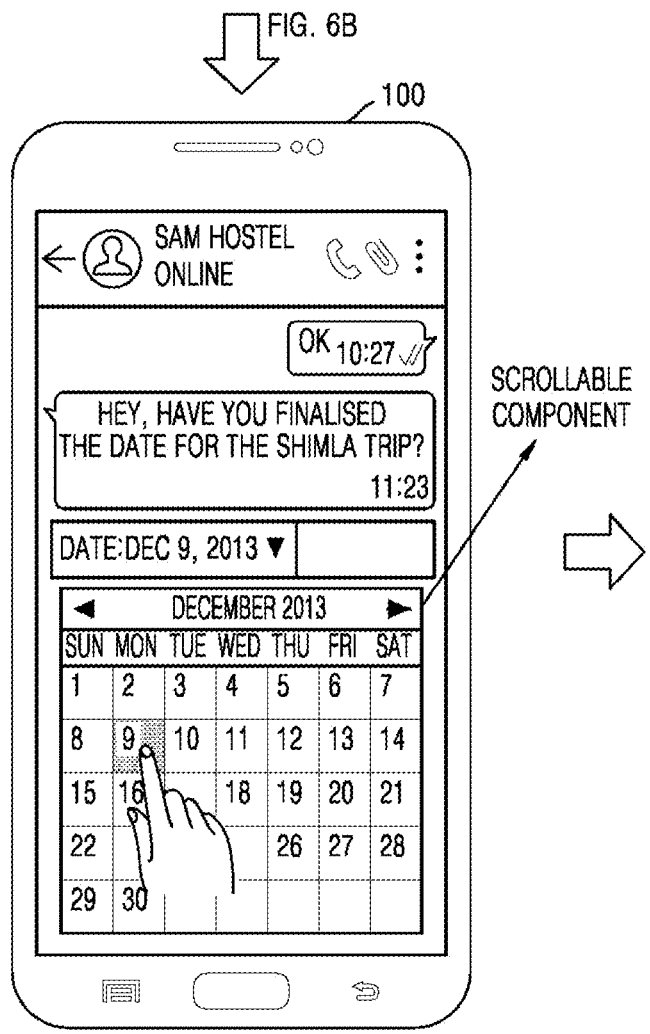
Figure 6D:
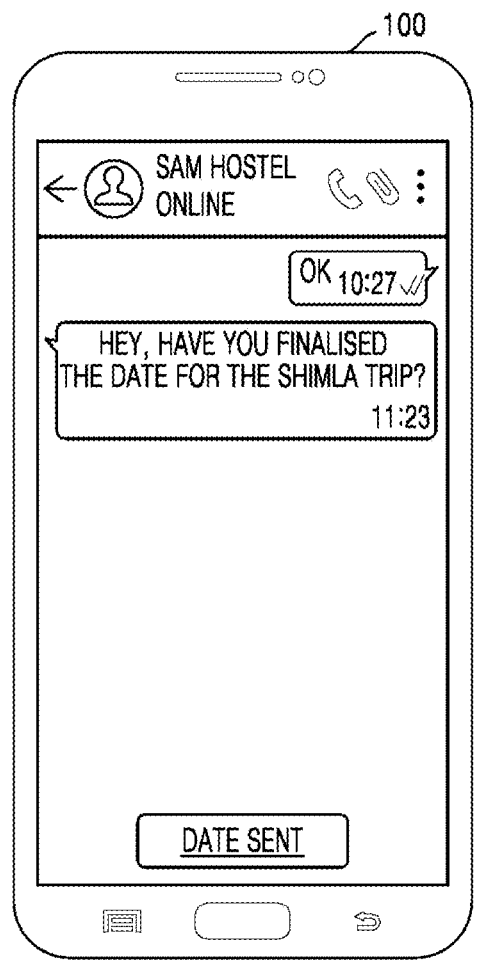

Further, as shown in FIG. 6C, the content manager 120 detects the input performed by the user to select the date for the trip to Shimla. The user selection or response is sent back to the chat application which shares the date for the trip to Shimla as shown in FIG. 6D. In related methods and systems, a user either types the date himself in a specific format if the user remembers the exact date or switches to the calendar application to read the calendar schedule and then switches back to the chat application to send the reply. Thus, the related methods and systems involve cumbersome and unnecessary steps and lack intuitiveness.

Figure 7C:
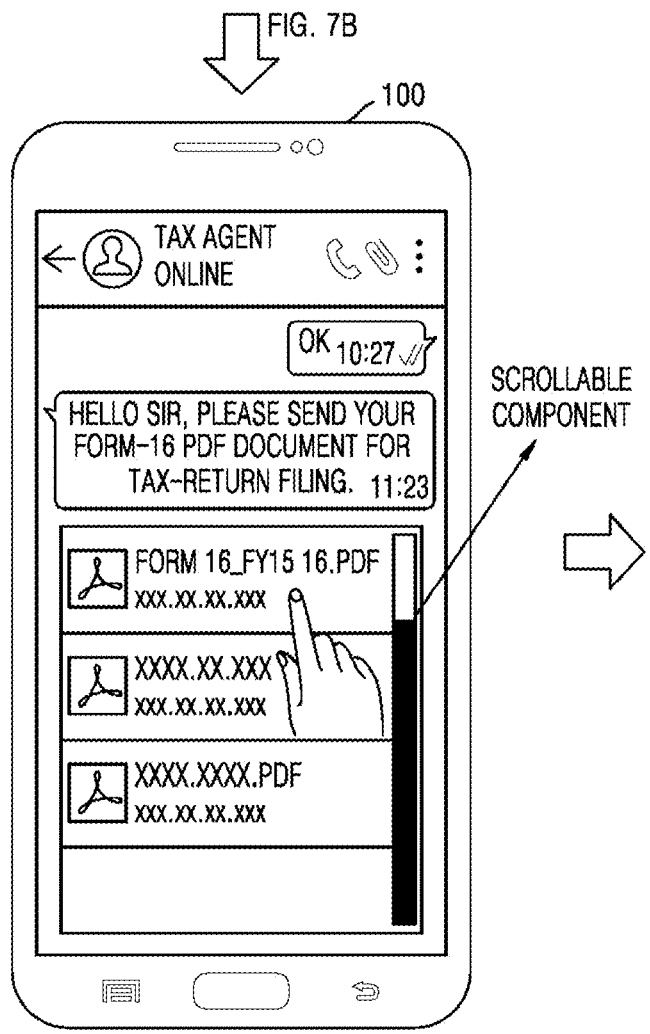

FIGS. 7A-7D illustrate a scenario in which a user "Tax Agent" receives a request to share a PDF file, according to an embodiment of the present disclosure. In this scenario, the user "Tax Agent" receives the request (or the query) "Hello Sir, please send your form-16 PDF document for tax-return filing as shown in FIG. 7A. The context analyzer 110 recognizes the need for responding to the request. The query generator 122 receives the query requesting the data item (i.e., the PDF document). After receiving the query, the query generator 122 generates a list of keywords (for example, file, PDF, Form-16, tax agent, etc.) and commands (i.e., selecting a file, finding a file, etc.) and sends the generated keywords and commands to the application scanner 124.

After receiving the keywords and commands, the application scanner 124 filters the applications available on the electronic device 100 to determine the second application (i.e., File Manager "My Files") including the requested data item based on the query as shown in FIG. 7B. After determining the "My Files" application (i.e., the passive application), the "My Files" application is accessed and the commands are provided to the "My Files" application via its API to list all PDF files. The response from the "My Files" application is received by the UI enhancement unit 130 and the graphical element is displayed in the graphical user interface of the chat application (i.e., the first application). The "My Files" application is populated within the graphical user interface of the chat application with an option to select one or more PDF files stored on the electronic device 100 as shown in FIG. 7C.

Figure 7D:
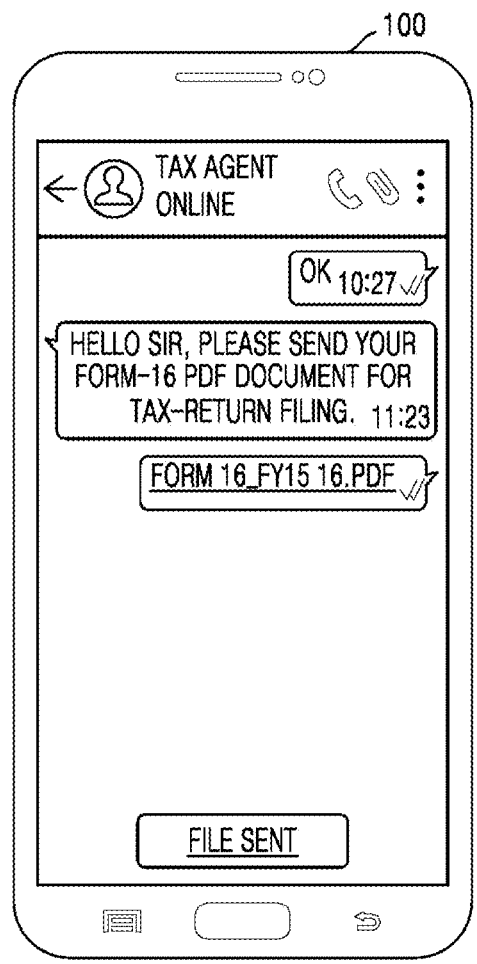

Further, as shown in FIG. 7C, the content manager 120 detects the input performed by the user to select the intended file. The user selection or response is sent back to the chat application which shares the file (i.e., the PDF document of Form-16) as shown in FIG. 7D. In related methods and systems, a user moves out of the chat application and selects a file browsing application installed on an electronic device. Further, the user either searches for the file or goes through multiple directories to locate the file. Further, the user selects a share option and sends the file via the same chat application where the user received the request. Thus, the related methods and systems involve cumbersome and unnecessary steps and lack intuitiveness.

Figure 8A:
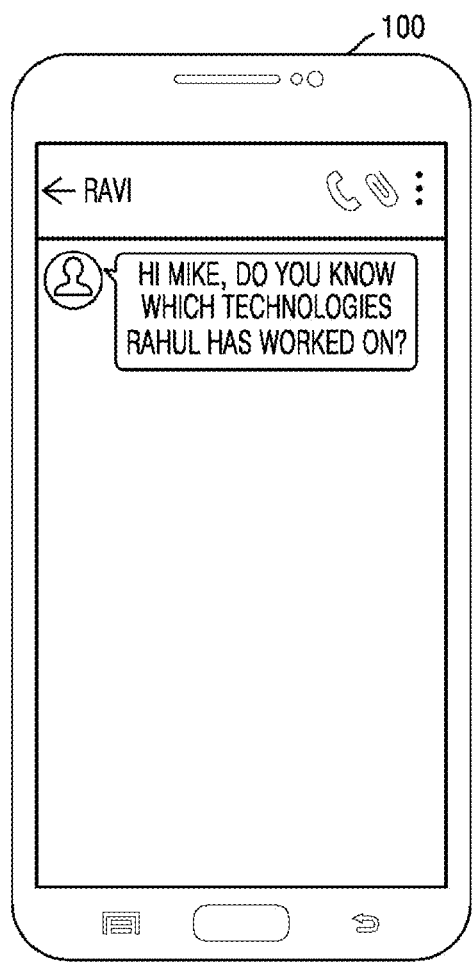
FIGS. 8A-8L illustrate a scenario in which a user "Ravi" sends a query in an SNS messaging application (i.e., a first application or an active application) seeking data (i.e., a requested data item) from a business and employment-oriented application to a user "Mike", according to an embodiment of the present disclosure.

FIGS. 8A-8L illustrate a scenario in which a user "Ravi" sends a query in an SNS messaging application (i.e., a first application or an active application) requiring data (i.e., a requested data item) from a business and employment-oriented application to a user "Mike", according to an embodiment of the present disclosure. In this scenario, the user "Ravi" sends the request (or the query) "Hi Mike, do you know which technologies Rahul has worked on?" as shown in FIG. 8A. The context analyzer 110 recognizes the need for sending a response. The query generator 122 receives the query requesting the data item (i.e., technologies). After receiving the query, the query generator 122 generates a list of keywords (for example, technologies, Rahul, worked, etc.) and commands (i.e., finding technologies, etc.) and sends the generated keywords and commands to the application scanner 124.

Figure 8B:
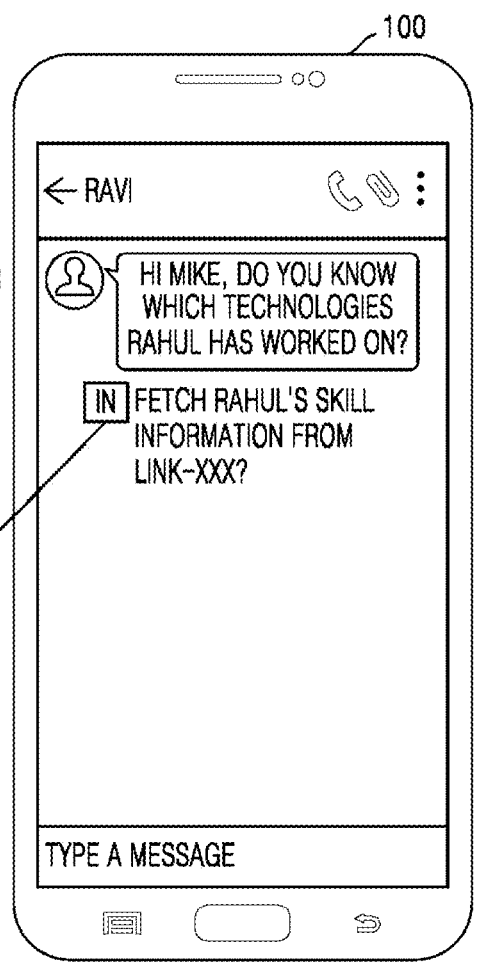
Figure 8C:
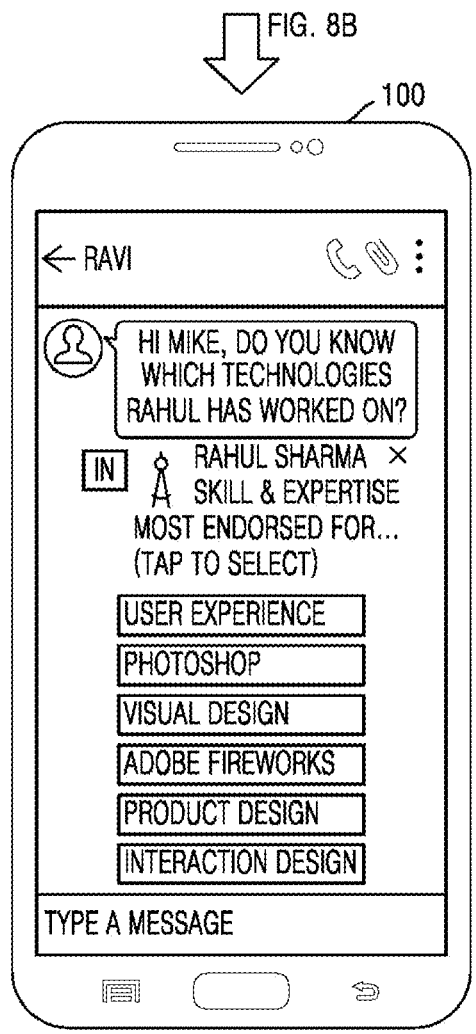

After receiving the keywords and commands, the application scanner 124 filters the applications available on the electronic device 100 to determine a second application (i.e., a business and employment-oriented application) including the requested data item based on the query as shown in FIG. 8B. After determining the business and employment-oriented application (i.e., the passive application), the business and employment-oriented application is accessed and the commands are provided to the business and employment-oriented application via its API. The response from the business and employment-oriented application is received by the UI enhancement unit 130 and the graphical element is displayed in the graphical user interface of the SNS messaging application (i.e., the first application). The business and employment-oriented application is populated within the graphical user interface of the SNS messaging application with an option to select the technologies as shown in FIG. 8C.

Figure 8D:
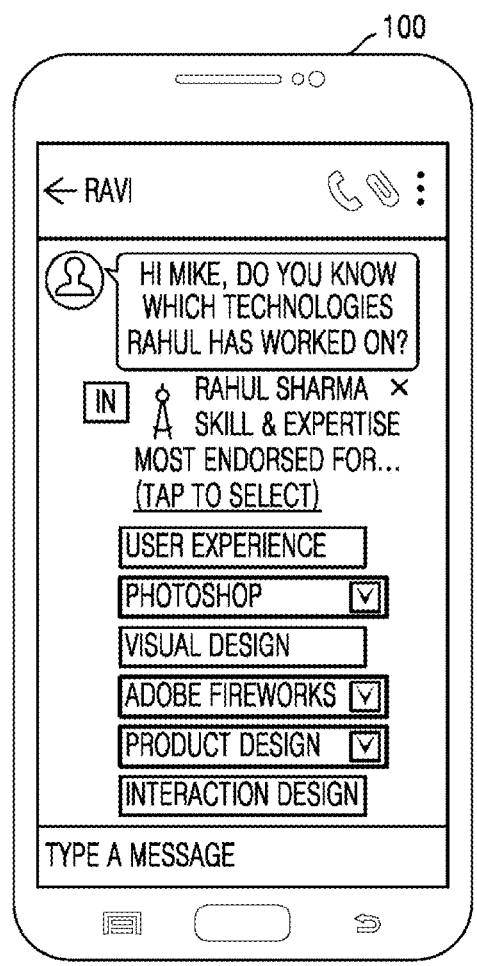
Figure 8E:
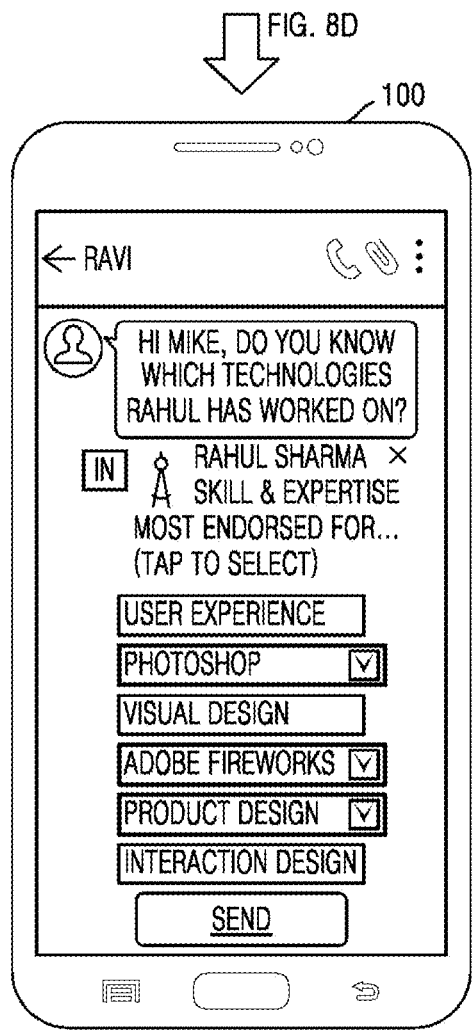
Figure 8F:
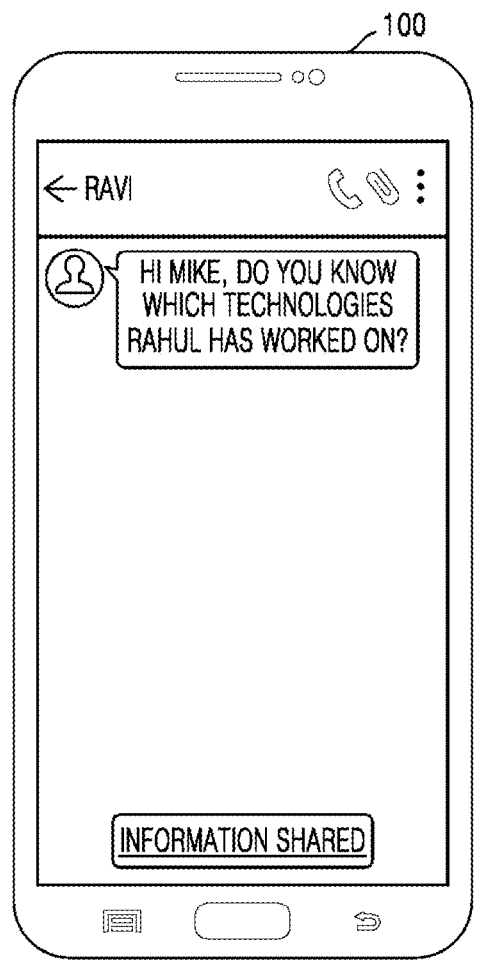
Figure 8G:
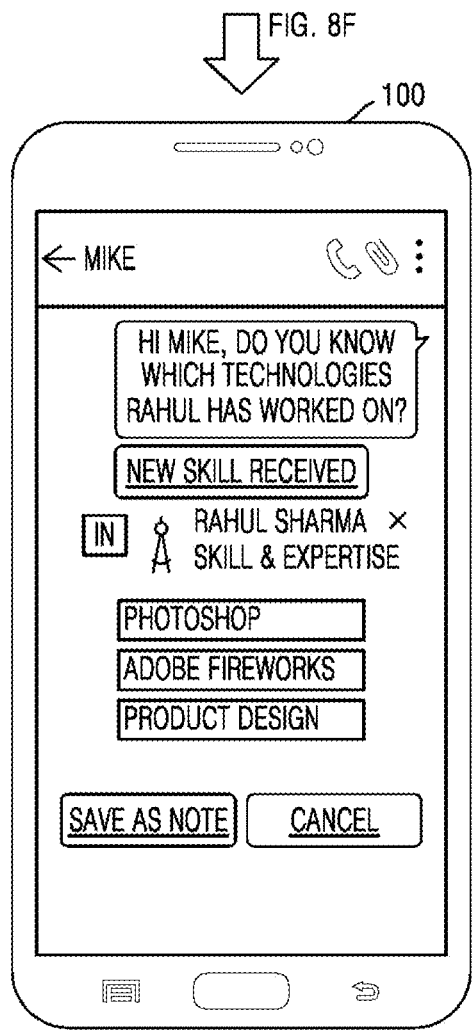
Figure 8H:
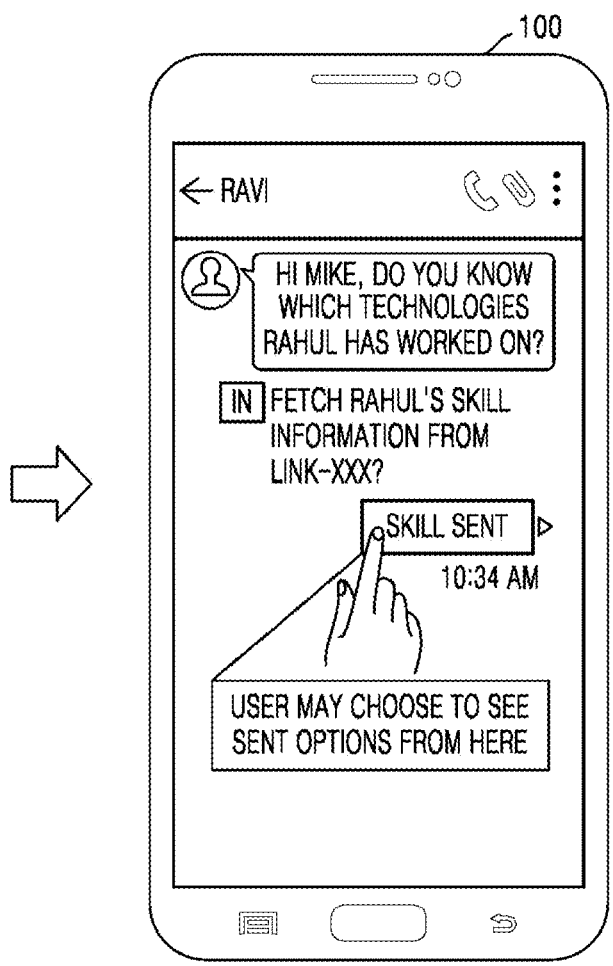
Figure 8I:
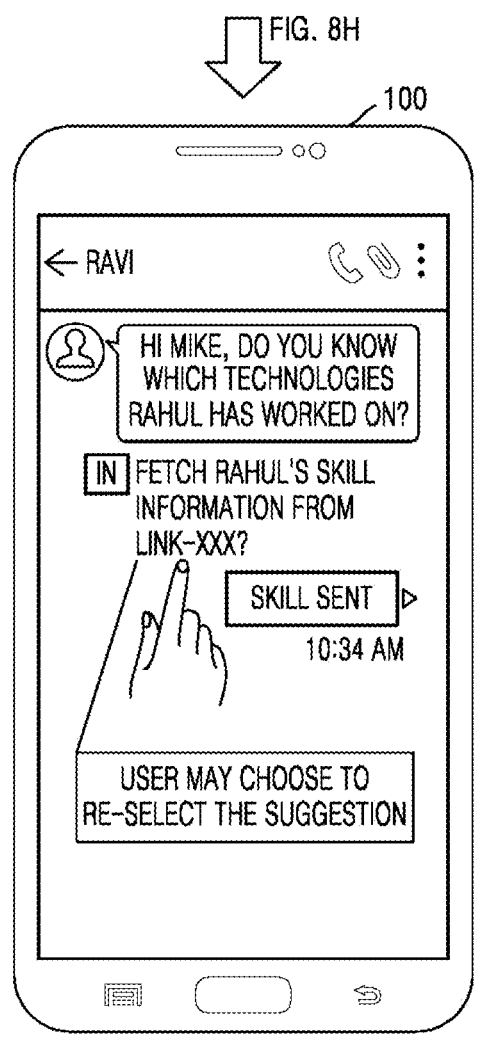
Figure 8J:
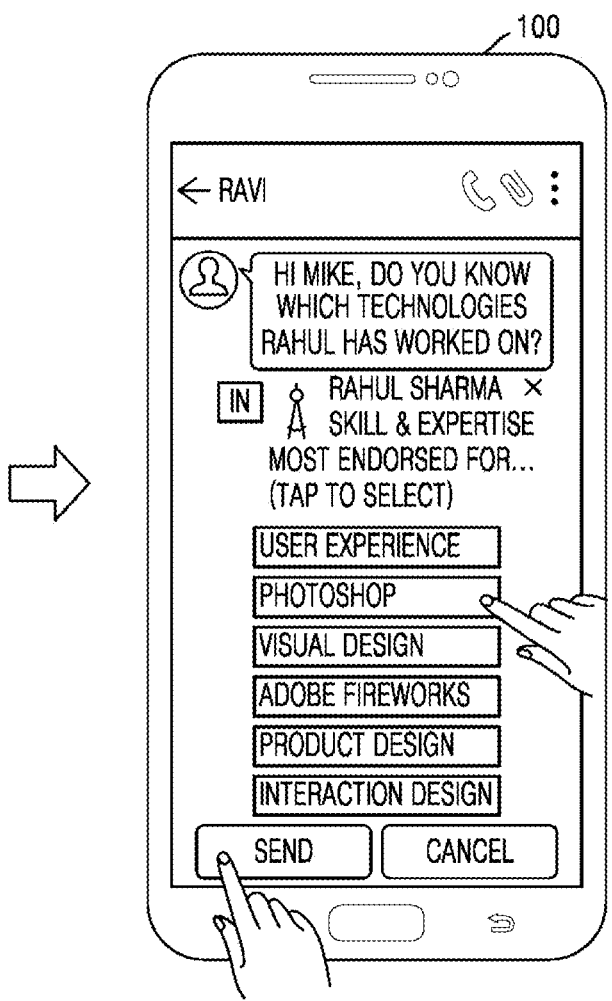
Figure 8K:
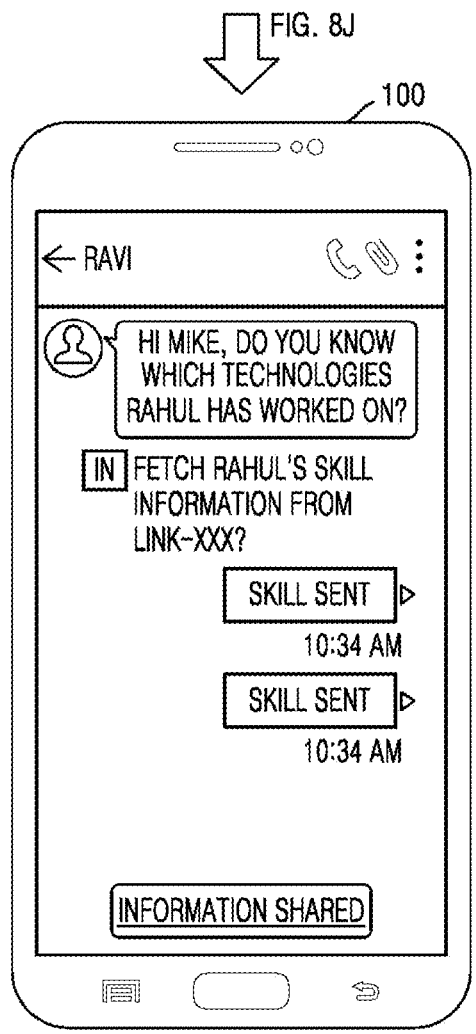
Figure 8L:
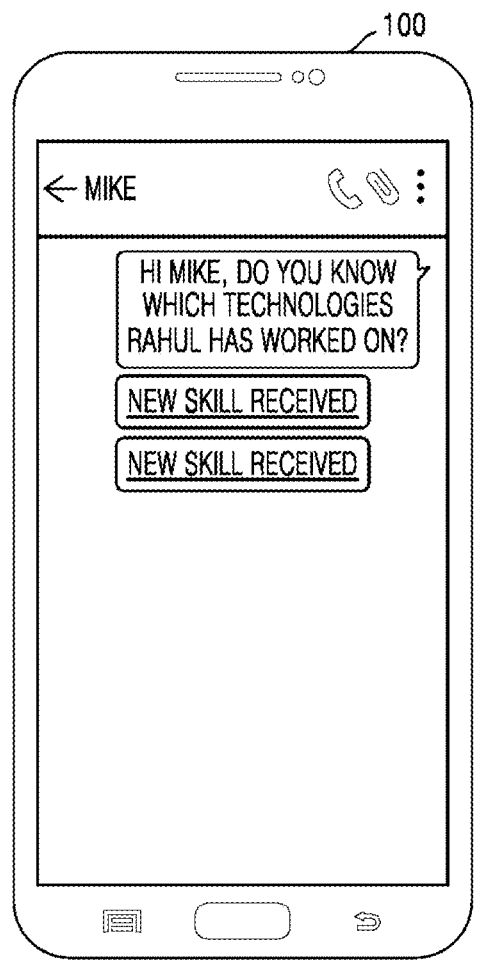

Further, as shown in FIG. 8D, the content manager 120 detects the input performed by the user to select the technologies. The user selection or response is sent back to the SNS messaging application which shares the technologies as shown in FIG. 8E. The selected technologies are sent to the requested user ("Mike") as shown in FIG. 8F. As shown in FIG. 8G, the user "Mike" receives the list of technologies. Further, the user "Ravi" may choose to view the sent options by performing the input on the interactive component "Skill sent" as shown in FIG. 8H. As shown in FIG. 8I, the user "Ravi" may choose to re-select the suggestions by selecting the graphical element of the business and employment-oriented application displayed within the graphical user interface of the SNS messaging application. Further, the user "Ravi" may select any option and send the selected option to the user "Mike" as shown in FIG. 8J. The sender ("Ravi") may be able to see both sent options as shown in FIG. 8K. As shown in FIG. 8L, the receiver ("Mike") may view both of the received options.

Figure 9A:
FIGS. 9A-C illustrate a scenario in which a user is provided with more than one second application for a query, according to an embodiment of the present disclosure.
Figure 9B:
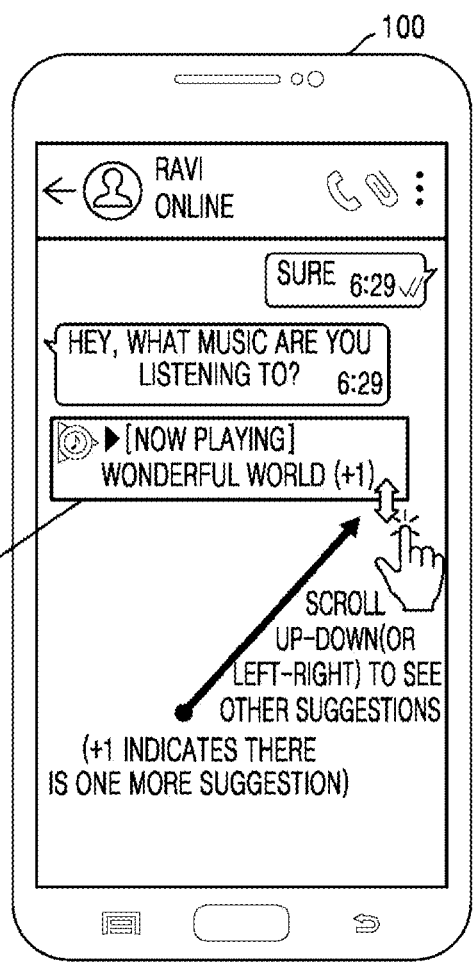
Figure 9C:
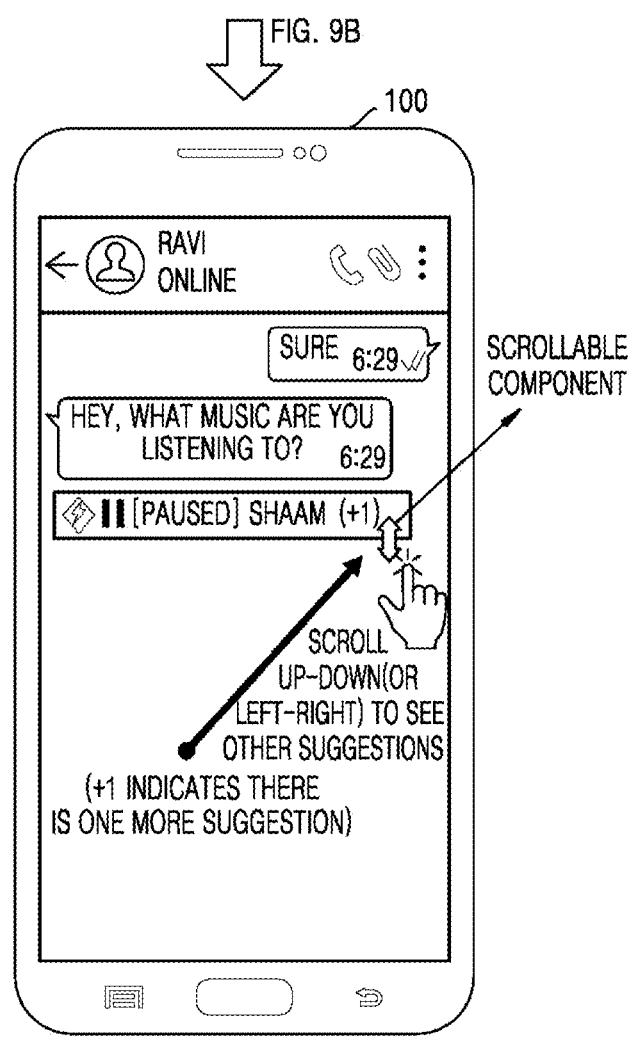

FIGS. 9A-9C illustrate a scenario in which a user is provided with more than one second application for a query, according to an embodiment of the present disclosure.
More than One Second Application for One Query In this scenario, the user "Ravi" receives a request (or a query) "Hey, what music are you listening to?" as shown in FIG. 9A. The context analyzer 110 recognizes the need for responding. The query generator 122 receives the query requesting the data item (i.e., music). After receiving the query, the query generator 122 generates a list of keywords (for example, music) and commands (i.e., selecting the music player, selecting a song, etc.) and sends the generated keywords and commands to the application scanner 124.

After receiving the keywords and commands from the query generator 122, the application scanner 124 may return more than one second application as the target applications.

In this case, the UI enhancement unit 130 allows the user "Ravi" to select an option among these available options by providing a suggestion pane just under the corresponding message. As shown in FIG. 9B, "+1" indicates that there is one more suggestion apart from the one which is currently displayed within the graphical user interface of the chat application. Further, the user "Ravi" performs an input to scroll up-down (or left-right) to see other available suggestions. Further, as shown in FIG. 9C, other available options are displayed to the user "Ravi".

Figure 10A:
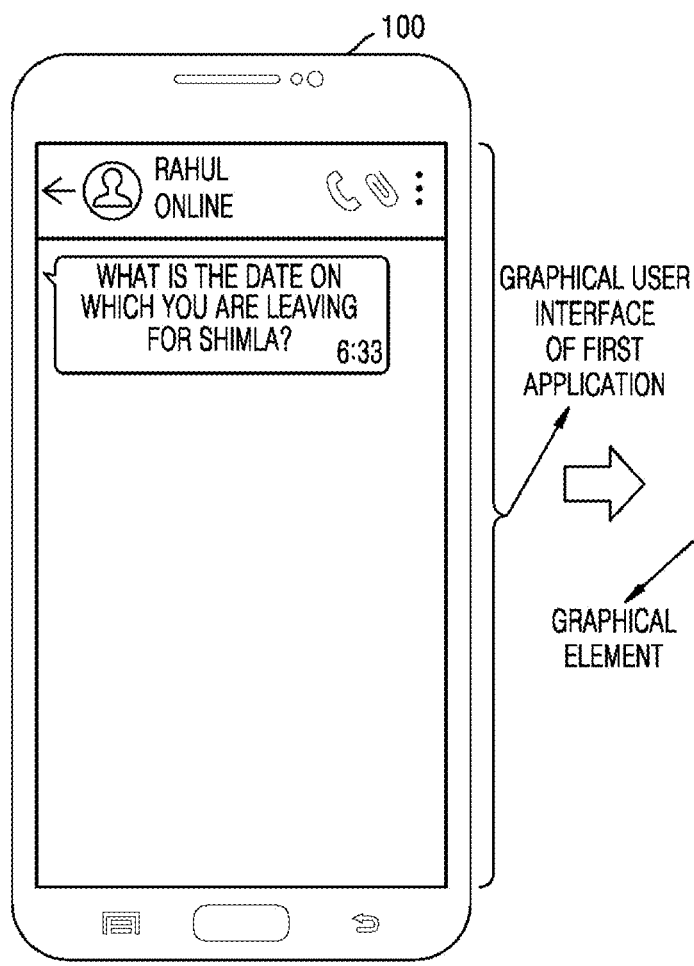
FIGS. 10A-10C illustrate another scenario in which a user is provided with more than one second application for a query, according to an embodiment of the present disclosure.
Figure 10B:
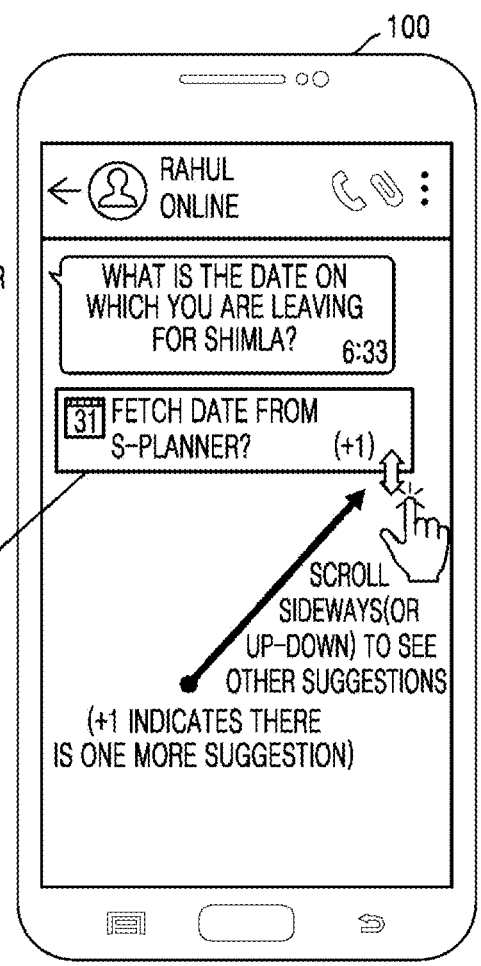
Figure 10C:
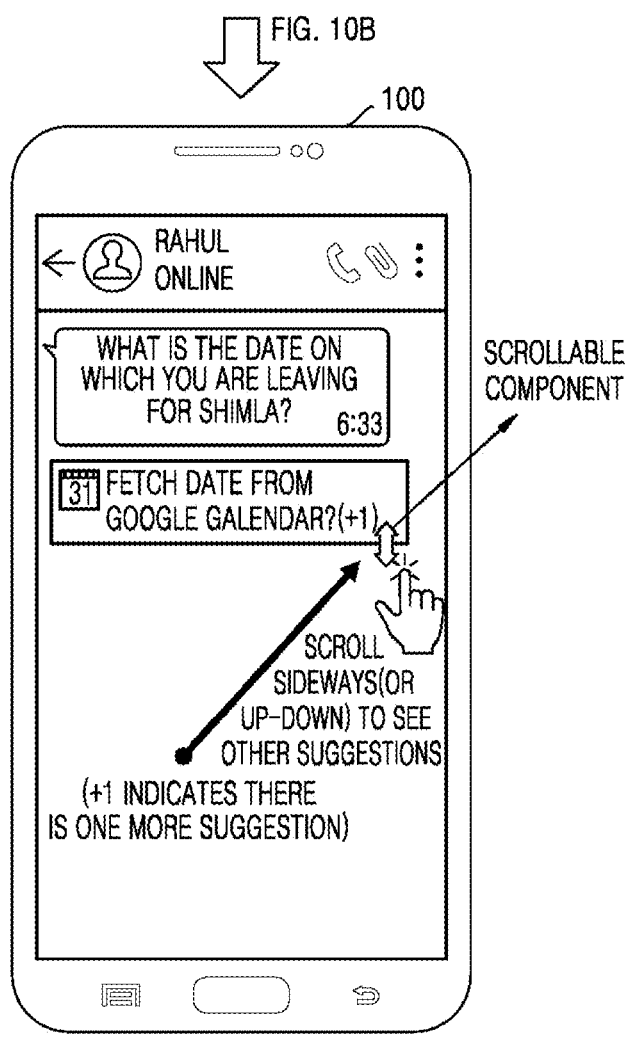

FIGS. 10A-10C illustrate another scenario in which a user is provided with more than one second application for a query, according to an embodiment of the present disclosure.
More than One Second Application for One Query In this scenario, the user "Ravi" receives a request (or a query) "what is the date on which you are leaving to Shimla?" as shown in FIG. 10A. The context analyzer 110 recognizes the need for sending a response. The query generator 122 receives the query requesting the data item (i.e., date). After receiving the query, the query generator 122 generates a list of keywords (for example, date, calendar, event, Shimla trip, etc.) and commands (i.e., selecting a date, finding a date, etc.) and sends the generated keywords and commands to the application scanner 124.

After receiving the keywords and commands from the query generator 122, the application scanner 124 may return more than one second application (i.e., S-planner application and calendar application) as the target applications. In this case, the UI enhancement unit 130 allows the user "Ravi" to select one option among these available options by providing a suggestion pane just under the corresponding message. As shown in FIG. 10B, "+1" indicates that there is one more suggestion apart from the one which is currently displayed (i.e., an interactive component of the S-planner application) within the graphical user interface of the chat application. Further, the user "Ravi" performs an input to scroll up-down (or left-right) to see other available suggestions. Further, as shown in FIG. 10C, other available option i.e., the interactive component of the calendar application is displayed to the user.

Figure 11C:
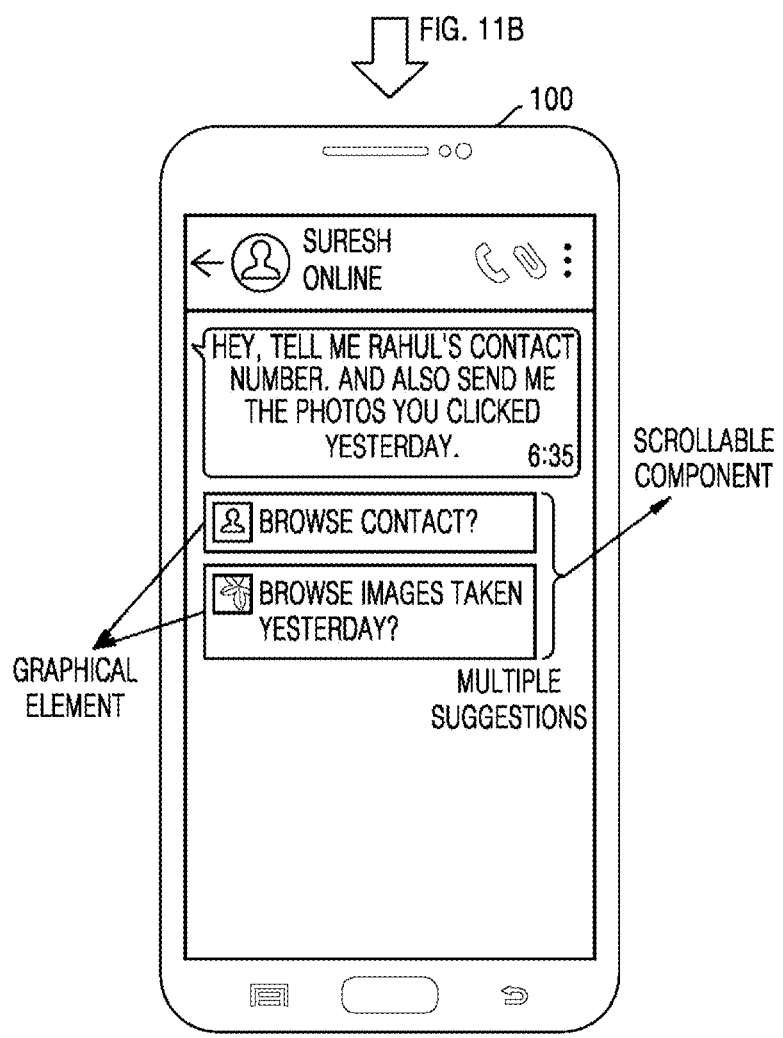

FIGS. 11A-11C illustrate a scenario in which a user is provided with more than one second application for more than one query, according to an embodiment of the present disclosure.
More than One Second Application for More than One Query In this scenario, the user "Suresh" receives a request (or a query) "Hey, tell me Rahul's contact number. And also send me the photos you clicked yesterday" as shown in FIG. 11A. The context analyzer 110 recognizes the need for responding. The query generator 122 receives the query requesting the data item (i.e., contact, photos). After receiving the query, the query generator 122 generates a list of keywords (for example, contact, photos, clicked, yesterday, etc.) and commands (i.e., selecting the contact, finding a photo, etc.) and sends the generated keywords and commands to the application scanner 124.

After receiving the keywords and commands from the query generator 122, the application scanner 124 returns more than one second application as the target applications as there are more than one query as shown in FIG. 11B. The application scanner 124 determines the two best possible passive applications (i.e., the second applications) such as a contact application and a gallery application as shown in FIG. 11B. In this case, the UI enhancement unit 130 allows the user to select one option between both options and the suggestions are populated for both the target applications as shown in FIG. 11C.

Although the embodiments above are explained in conjunction with the electronic device 100, the same can be applied to an IoT device, AR device, VR device, etc. The functions performed by the electronic device 100 can be performed by the IoT device, the AR device, the VR device, etc. without departing from the scope of the present disclosure.

Although the operations for managing the content across the applications may be performed by the electronic device 100 alone, some of the operations may be performed remotely by another electronic device of the user without departing from the scope of the present disclosure. In an embodiment of the present disclosure, the electronic device 100 may be configured to receive the at least one query requesting the data item from the first application. After receiving the at least one query, the electronic device 100 may send the received at least one query to another electronic device. After receiving the query, the other electronic device may determine the at least one second application including the requested data item based on the at least one query and display the graphical element on the graphical user interface of the first application, the graphical element including the indicia indicating the at least one second application and the at least one interactive component to interact with the data item within the graphical user interface of the first application.

Figure 12:
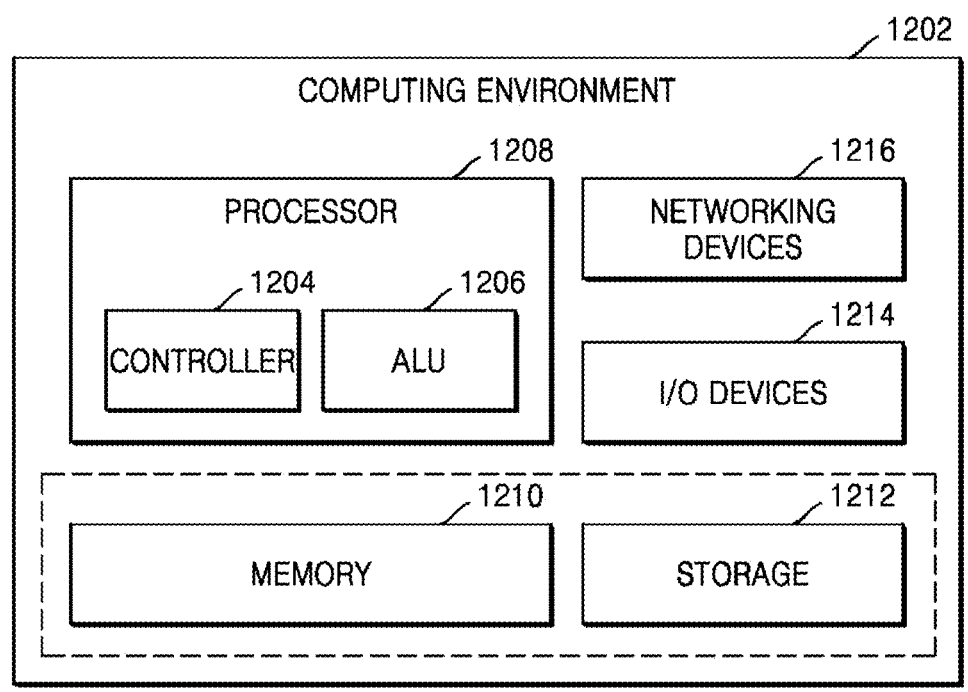
FIG. 12 illustrates a computing environment using a method and an electronic device for managing content across applications, according to an embodiment of the present disclosure.

FIG. 12 illustrates a computing environment 1200 using the method and the electronic device 100 for managing content across applications, according to an embodiment of the present disclosure. In an embodiment of the present disclosure, the computing environment 1202 may include one or more terminals. As depicted in FIG. 12, the computing environment 1202 may include at least one processor 1208 including a controller 1204, an arithmetic logic unit (ALU) 1206, a memory 1210, a storage 1212, a plurality of networking devices 1216, and a plurality of input/output (I/O) devices 1214. The at least one processor 1208 is capable of processing instructions according to various schemes. The at least one processor 1208 may receive commands from the controller 1204 in order to perform a processing process. Further, any logical and arithmetic operations involved in the execution of the instructions are performed in conjunction with the ALU 1206.

The computing environment 1202 may further include multiple homogeneous or heterogeneous cores, multiple CPUs of different kinds, special media, accelerators, and the like. The at least one processor 1208 may process the instructions according to the schemes. Further, the at least one processor 1208 may be located on a single chip or over multiple chips.

The schemes include instructions and codes used for operation of the computing environment 1200 are stored in the memory 1210, the storage 1212, or both. When the instructions are executed, the instructions may be fetched from the corresponding memory 1210 or storage 1212 and may be executed by the at least one processor 1208.

The networking devices 1216 and the external I/O devices 1214 may be included in the computing environment 1200 to support the operation thereof.

The present disclosure may be implemented through at least one software program running on at least one hardware device and performing network management functions to control the elements of the electronic device 100. The elements shown in FIGS. 1 through 12 may each include one or more of a hardware device, a combination of hardware devices, or a combination of a hardware device(s) and software.

The foregoing description of the present disclosure shows general aspects that one of ordinary skill in the art may, by applying current knowledge, readily modify or adapt without departing from the general concept of the present disclosure. Therefore, such adaptations and modifications should and are intended to be comprehended within the meaning and range of equivalents of the present disclosure. It is to be understood that the phraseology or terminology employed herein is for the purpose of description and not of limitation. Therefore, while the embodiments herein have been described in terms of the present disclosure, those skilled in the art will recognize that the embodiments herein may be practiced with modification within the spirit and scope described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of managing content across applications available on an electronic device, the method comprising:

receiving, in a first application of a chat application, at least one query requesting at least one data item as an incoming communication from a second electronic device;

displaying on a graphical user interface of the first application, a graphical element comprising a plurality of icons each of which corresponds to each of a plurality of second applications filtered in response to the at least one query, and indicia indicating that the plurality of second applications are arranged based on a degree of relevance of the plurality of second applications with respect to the requesting of the at least one data item;

determining, among the plurality of second applications, at least one second application comprising a plurality of data items in response to a user selection of, among the plurality of icons, an icon corresponding to the at least one second application;

displaying a plurality of data items derived from the at least one second application in at least one interactive component, wherein the at least one interactive component is populated by the at least one second application without leaving the first application of the chat application;

detecting an input of selecting the at least one data item among the plurality of data items, wherein the input is performed on the at least one interactive component; and sending, at the first application, the at least one data item to the second electronic device based on the input within the graphical user interface of the first application.

2. The method of claim 1, wherein the first application is an active application and the at least one second application is one of an active application or a passive application.

3. The method of claim 1, wherein the requested at least one data item in the at least one query is identified based on one or more of content of the first application, metadata of the content of the first application, storing time of the content of the first application, type of the content of the first application, type of device or environment where the content of the first application is stored and used, status information indicating whether a user is allowed to access the content of the first application, or context analysis of the first application; and the content of the first application is stored on one or more of the electronic device, another electronic device, a cloud system, a computing platform, an online storage, or a cyberlocker.

4. The method of claim 1, wherein the at least one query is automatically generated based on one or more of content of the first application, metadata of the content of the first application, storing time of the content of the first application, type of the content of the first application, type of device or environment where the content of the first application is stored and used, status information indicating whether a user is allowed to access the content of the first application, or context analysis of the first application; and the content of the first application is stored on one or more of the electronic device, another electronic device, a cloud system, a computing platform, an online storage, or a cyberlocker.

5. The method of claim 1, wherein the at least one second application comprising the requested at least one data item is determined based on one or more of content of the first application, metadata of the content of the first application, storing time of the content of the first application, type of the content of the first application, type of device or environment where the content of the first application is stored and used, status information indicating whether a user is allowed to access the content of the first application, context analysis of the first application, or user history activities; and the content of the first application is stored on one or more of the electronic device, another electronic device, a cloud system, a computing platform, an online storage, or a cyberlocker.

6. The method of claim 1, wherein the first application is same as or different from the at least one second application.

7. An electronic device for managing content across applications available on the electronic device, the electronic device comprising:

at least one processor operable to:

receive, in a first application of a chat application, at least one query requesting at least one data item as an incoming communication from a second electronic device;

control to display a graphical element on a graphical user interface of the first application, wherein the graphical element comprises a plurality of icons each of which corresponds to each of a plurality of second applications filtered in response to the at least one query, and indicia indicating that the plurality of second applications are arranged based on a degree of relevance of the plurality of second applications with respect to the requesting of the at least one data item;

determine, among the plurality of second applications, at least one second application comprising a plurality of data items in response to a user selection of, among the plurality of icons, an icon corresponding to the at least one second application;

display a plurality of data items derived from the at least one second application in at least one interactive component, wherein the at least one interactive component is populated by the at least one second application without leaving the first application of the chat application;

detect an input of selecting the at least one data item among the plurality of data items, wherein the input is performed on the at least one interactive component; and send, at the first application, the at least one data item to the second electronic device based on the input within the graphical user interface of the first application.

8. The electronic device of claim 7, wherein the first application is an active application and the at least one second application is one of an active application or a passive application.

9. The electronic device of claim 7, wherein the requested at least one data item in the at least one query is identified based on one or more of content of the first application, metadata of the content of the first application, storing time of the content of the first application, type of the content of the first application, type of device or environment where the content of the first application is stored and used, status information indicating whether a user is allowed to access the content of the first application, or context analysis of the first application; and the content of the first application is stored on one or more of the electronic device, another electronic device, a cloud system, a computing platform, an online storage, or a cyberlocker.

10. The electronic device of claim 7, wherein the at least one query is automatically generated by a query generator based on content of the first application, metadata of the content of the first application, storing time of the content of the first application, type of the content of the first application, type of device or environment where the content of the first application is stored and used, status information indicating whether a user is allowed to access the content of the first application, and context analysis of the first application; and the content of the first application is stored on one or more of the electronic device, another electronic device, a cloud system, a computing platform, an online storage, or a cyberlocker.

11. The electronic device of claim 7, wherein the at least one second application comprising the requested at least one data item is determined based on one or more of content of the first application, metadata of the content of the first application, storing time of the content of the first application, type of the content of the first application, type of device or environment where the content of the first application is stored and used, status information indicating whether a user is allowed to access the content of the first application, context analysis of the first application, or user history activities, the content of the first application is stored on one or more of the electronic device, another electronic device, a cloud system, a computing platform, an online storage, or a cyberlocker; and the first application is the same as or different from the at least one second application.

12. A non-transitory computer readable recording medium embodying a computer program for operating an electronic device including a processor, the computer program comprising instructions that, when executed by the processor, cause the electronic device to:

receive, in a first application of a chat application, at least one query requesting at least one data item as an incoming communication from a second electronic device;

display on a graphical user interface of the first application, a graphical element comprising a plurality of icons each of which corresponds to each of a plurality of second applications filtered in response to the at least one query, and indicia that the plurality of second applications are arranged based on a degree of relevance of the plurality of second applications with respect to the requesting of the at least one data item;

determine, among the plurality of second applications, at least one second application comprising a plurality of data items in response to a user selection of, among the plurality of icons, an icon corresponding to the at least one second application;

display a plurality of data items derived from the at least one second application in at least one interactive component, wherein the at least one interactive component is populated by the at least one second application without leaving the first application of the chat application;

detect an input of selecting the at least one data item among the plurality of data items, wherein the input is performed on the at least one interactive component; and send, at the first application, the at least one data item to the second electronic device based on the input within the graphical user interface of the first application.

* * * * *